(12) United States Patent
Nishimura

(10) Patent No.: US 9,291,502 B2
(45) Date of Patent: *Mar. 22, 2016

(54) SPECTROSCOPIC MEASUREMENT DEVICE AND SPECTROSCOPIC MEASUREMENT METHOD

(71) Applicant: Seiko Epson Corporation, Tokyo (JP)

(72) Inventor: Teruyuki Nishimura, Matsumoto (JP)

(73) Assignee: Seiko Epson Corporation (JP)

( * ) Notice: Subject to any disclaimer, the term of this patent is extended or adjusted under 35 U.S.C. 154(b) by 150 days.

This patent is subject to a terminal disclaimer.

(21) Appl. No.: 13/933,726

(22) Filed: Jul. 2, 2013

(65) Prior Publication Data

US 2014/0009761 A1 Jan. 9, 2014

(30) Foreign Application Priority Data

Jul. 4, 2012 (JP) ................ 2012-150346

(51) Int. Cl.
| | |
|---|---|
| G01B 9/02 | (2006.01) |
| G01J 3/45 | (2006.01) |
| G01J 3/433 | (2006.01) |
| G01J 3/02 | (2006.01) |
| G01J 3/26 | (2006.01) |
| G02B 26/00 | (2006.01) |

(52) U.S. Cl.
CPC .............. *G01J 3/433* (2013.01); *G01J 3/027* (2013.01); *G01J 3/0264* (2013.01); *G01J 3/26* (2013.01); *G02B 26/001* (2013.01)

(58) Field of Classification Search
CPC ........... G01J 3/0264; G01J 3/027; G01J 3/26; G01J 3/433; G02B 26/001
See application file for complete search history.

(56) References Cited

U.S. PATENT DOCUMENTS

| | | |
|---|---|---|
| 3,660,761 A | 5/1972 | Harmon, Jr. et al. |
| 6,452,646 B1 | 9/2002 | Sharp et al. |
| 7,106,514 B2 | 9/2006 | Murata et al. |
| 7,130,103 B2 | 10/2006 | Murata |
| 7,190,523 B2 | 3/2007 | Yoda |
| 7,286,244 B2 | 10/2007 | Murata |
| 7,940,446 B2 | 5/2011 | Scott et al. |

(Continued)

FOREIGN PATENT DOCUMENTS

| | | |
|---|---|---|
| JP | 07-243963 | 9/1995 |
| JP | 07-243963 A | 9/1995 |

(Continued)

*Primary Examiner* — Michael A Lyons
(74) *Attorney, Agent, or Firm* — Harness, Dickey & Pierce, P.L.C.

(57) ABSTRACT

A spectroscopic measurement device includes a variable wavelength interference filter provided with a first reflecting film, a second reflecting film, and an electrostatic actuator for changing a gap amount of a gap between the first reflecting film and the second reflecting film, a detection section adapted to detect the light intensity of the light taken out by the variable wavelength interference filter, a voltage setting section and a voltage control section for applying an analog voltage varying continuously to the electrostatic actuator, a voltage monitoring section for monitoring the voltage applied to the electrostatic actuator, a storage section for storing V-λ data, and a light intensity acquisition section for obtaining the light intensity detected by the detection section at a timing at which the light transmitted through the variable wavelength interference filter has the measurement target wavelength based on the voltage monitored by the voltage monitoring section.

11 Claims, 9 Drawing Sheets

(56) References Cited

U.S. PATENT DOCUMENTS

| | | |
|---|---|---|
| 8,135,286 B2 | 3/2012 | Ridley et al. |
| 8,462,348 B2 | 6/2013 | Shinto et al. |
| 8,512,492 B2 | 8/2013 | Yamazaki |
| 8,512,493 B2 | 8/2013 | Yamazaki |
| 8,559,111 B2 | 10/2013 | Nishimura et al. |
| 8,586,929 B2 * | 11/2013 | Barth ............................ 250/342 |
| 8,848,196 B2 * | 9/2014 | Nishimura et al. ........... 356/454 |
| 2004/0070768 A1 | 4/2004 | McDaniel et al. |
| 2005/0007933 A1 | 1/2005 | Yoda |
| 2005/0111008 A1 | 5/2005 | Murata |
| 2005/0122191 A1 | 6/2005 | Nakamura et al. |
| 2005/0219680 A1 | 10/2005 | Ishikawa |
| 2007/0121205 A1 | 5/2007 | Miles |
| 2008/0037093 A1 | 2/2008 | Miles |
| 2009/0064772 A1 | 3/2009 | Wang |
| 2010/0045971 A1 | 2/2010 | Brokopp |
| 2011/0043891 A1 | 2/2011 | Miles |
| 2011/0109909 A1 | 5/2011 | Wu |
| 2011/0176128 A1 | 7/2011 | Matsuno |
| 2011/0188110 A1 | 8/2011 | Miles |
| 2011/0194118 A1 | 8/2011 | Hirokubo et al. |
| 2011/0205551 A1 | 8/2011 | Saito et al. |
| 2011/0222157 A1 | 9/2011 | Sano |
| 2011/0222158 A1 * | 9/2011 | Sano ............................ 359/584 |
| 2011/0228397 A1 | 9/2011 | Matsushita |
| 2012/0019812 A1 | 1/2012 | Shinto et al. |
| 2012/0019827 A1 | 1/2012 | Shinto et al. |
| 2012/0044491 A1 | 2/2012 | Urushidani et al. |
| 2012/0050742 A1 | 3/2012 | Sano |
| 2012/0086945 A1 | 4/2012 | Hirokubo et al. |
| 2012/0109584 A1 | 5/2012 | Urushidani |
| 2012/0120402 A1 | 5/2012 | Hirokubo et al. |
| 2012/0188552 A1 | 7/2012 | Hirokubo |
| 2012/0257205 A1 | 10/2012 | Hirokubo |
| 2013/0070247 A1 | 3/2013 | Funamoto |
| 2013/0107262 A1 | 5/2013 | Nishimura |
| 2013/0114083 A1 | 5/2013 | Sano |
| 2013/0279005 A1 | 10/2013 | Sano |

FOREIGN PATENT DOCUMENTS

| | | | |
|---|---|---|---|
| JP | 2002-071562 A | | 3/2002 |
| JP | 2002-277640 | | 9/2002 |
| JP | 2002-277758 | | 9/2002 |
| JP | 2003-177093 A | | 6/2003 |
| JP | 2003-185942 A | | 7/2003 |
| JP | 2005-031115 A | | 2/2005 |
| JP | 2005-250376 A | | 9/2005 |
| JP | 2005-305614 A | | 11/2005 |
| JP | 2006-220623 | | 8/2006 |
| JP | 2009-512890 | | 3/2009 |
| JP | 2009-512891 | | 3/2009 |
| JP | 2011-106936 | | 6/2011 |
| JP | 2013092474 A | * | 5/2013 |
| JP | 2013-182143 A | | 9/2013 |

* cited by examiner

SPECTROSCOPIC MEASUREMENT DEVICE AND SPECTROSCOPIC MEASUREMENT METHOD

BACKGROUND

1. Technical Field

The present invention relates to a spectroscopic measurement device and a spectroscopic measurement method.

2. Related Art

In the past, there has been known a variable wavelength interference filter having a pair of reflecting films opposed to each other and varying the distance between the reflecting films to thereby take out the light having a predetermined wavelength out of the light as the measurement object. Further, there has been known a spectroscopic measurement device for measuring the optical spectrum of the light as the measurement object using such a variable wavelength interference filter as described above (see, e.g., JP-A-7-243963 (Document 1)).

The optical resonator (the variable wavelength interference filter) described in Document 1 is provided with a first substrate having a surface provided with a recessed section, and a second substrate, wherein the second substrate is bonded so as to block up the inside of the recessed section of the first substrate. Further, the bottom portion of the recessed section of the first substrate and the surface of the second substrate opposed to the recessed section are respectively provided with high-reflecting films opposed to each other and electrodes for regulating the gap (inter-reflecting film gap) between these reflecting films. Further, the second substrate has a thick-wall portion and a thin-wall portion disposed in a region opposed to the recessed section, and it becomes possible for the thick-wall portion to move back and forth toward the recessed section due to the deflection of the thin-wall portion.

In such a variable wavelength interference filter, it becomes possible to regulate the inter-reflection film gap by making the thick-wall portion move back and forth toward the first substrate by deforming the thin-wall portion as a diaphragm by applying a voltage between the electrodes.

Incidentally, in the case of taking out the light with the target wavelength using such a variable wavelength interference filter as described above, the voltage corresponding to the target wavelength is applied between the electrodes. On this occasion, since the electrostatic attractive force due to the application of the voltage and the elastic force of the thin-wall portion of the second substrate act on the thick-wall portion of the second substrate, the thick-wall portion vibrates.

Therefore, in the past, in order to accurately measure the light with the target wavelength, such a spectroscopic measurement device using the variable wavelength interference filter waits until the vibration of the thick-wall portion settles, and then performs the light intensity measurement process after the vibration of the thick-wall portion has settled. Therefore, there is a problem that the time required for the measurement increases.

In particular, in the spectroscopic measurement device, it is necessary to sequentially change the wavelength as the measurement object in a predetermined wavelength band, and measure the light intensity of each wavelength. Therefore, if such a stand-by time as described above is provided to every measurement object, there is a problem that the time required for the measurement further increases.

SUMMARY

An advantage of some aspects of the invention is to provide a spectroscopic measurement device capable of prompt spectroscopic measurement.

A spectroscopic measurement device according to an aspect of the invention includes a first substrate, a second substrate opposed to the first substrate, a first reflecting film provided to the first substrate, a second reflecting film provided to the second substrate, and opposed to the first reflecting film via a predetermined inter-reflecting film gap, a gap amount changing section adapted to change the gap amount of the inter-reflecting film gap by deflecting the second substrate by applying a voltage, a detection section adapted to detect a light intensity of light taken out by the first reflecting film and the second reflecting film, a filter drive section adapted to apply an analog voltage continuously varying to the gap amount changing section, a voltage monitoring section adapted to monitor the voltage applied to the gap amount changing section, a storage section adapted to store V-λ data corresponding to a relationship between the voltage applied to the gap amount changing section and a wavelength of the light taken out by the first reflecting film and the second reflecting film, and a light intensity acquisition section adapted to obtain the light intensity detected by the detection section at a timing at which the light taken out by the first reflecting film and the second reflecting film has a desired measurement target wavelength based on the voltage monitored by the voltage monitoring section.

According to this aspect of the invention, the spectroscopic measurement device is provided with the gap amount changing section for changing the gap amount of the inter-reflecting film gap between the first reflecting film and the second reflecting film, and the gap amount changing section deflects the second substrate toward the first substrate by applying the voltage, to thereby change the gap amount of the inter-reflecting film gap.

Here, in the case of applying a predetermined step voltage to the gap amount changing section in order to set the gap amount of the inter-reflecting film gap to a desired value, since the drive force received from the gap amount changing section and the elastic force (the spring force) inherent in the second substrate act on the second substrate, the second substrate vibrates, and therefore, it is necessary to wait until the fluctuation of the inter-reflecting film gap is converged.

In contrast, in this aspect of the invention, the filter drive section applies the analog voltage continuously varying to the gap amount changing section. Therefore, the inter-reflecting film gap has the gap amount continuously varying in accordance with the level of the analog voltage. Therefore, the light intensity acquisition section monitors the applied voltage to the gap amount changing section monitored by the voltage monitoring section based on the V-λ data, and then obtains the light intensity detected by the detection section at the timing at which the light corresponding to the measurement target wavelength is taken out by the first reflecting film and the second reflecting film. On this occasion, since it is not required to wait until the vibration of the second substrate is settled, the detection of the light intensity corresponding to the measurement target wavelength can promptly be performed, and thus, the prompt measurement of the optical spectrum of the measurement target light can be performed.

Further, at the timing at which the voltage is applied to the gap amount changing section, the signal delay in the voltage controlling circuit and the delay due to the physicality (e.g., the rigidity and the spring force of the second substrate) of the second substrate occur. In contrast, in this aspect of the invention, since the voltage applied to the gap amount changing section is monitored, and the light intensity is obtained at the timing at which the light taken out by the first reflecting film and the second reflecting film has the measurement target wavelength, it results that the light intensity with consideration for such delays as described above is obtained. Thus, the spectroscopic measurement can promptly and accurately be performed.

In the spectroscopic measurement device according to the above aspect of the invention, it is preferable that the filter drive section applies the analog voltage, a variation pattern of which with time is a predetermined fixed pattern, to the gap amount changing section, the V-λ data is data representing a relationship between the voltage applied to the gap amount changing section and the wavelength of the light taken out by the first reflecting film and the second reflecting film at the timing at which the voltage is applied to the gap amount changing section when applying the analog voltage with the variation pattern to the gap amount changing section, and the light intensity acquisition section obtains a target voltage corresponding to the measurement target wavelength based on the V-λ data, and obtains the light intensity detected by the detection section at a timing at which the voltage monitored by the voltage monitoring section reaches the target voltage.

In this aspect of the invention, the variation pattern (the voltage waveform) of the analog voltage to be applied to the gap amount changing section by the filter drive section is set to a certain specific fixed pattern. Further, the wavelength of the light taken out by the first reflecting film and the second reflecting film at the timing at which the predetermined voltage is applied when applying the voltage to the gap amount changing section based on the variation pattern is recorded in the V-λ data. Therefore, the V-λ data becomes the data representing the relationship between the voltage and the wavelength with consideration for the delay time such as the signal delay in the voltage controlling circuit and the vibration delay based on the physicality of the second substrate. It should be noted that the variation pattern of the analog voltage is not limited to a single fixed pattern, but can include a plurality of patterns, and in such a case, it is sufficient to store the V-λ data corresponding to each of the patterns in the storage section.

Thus, the light intensity acquisition device obtains the target voltage corresponding to the measurement target wavelength from the V-λ data, and then obtains the light intensity at the timing at which the voltage monitored by the voltage monitoring section reaches the target voltage, and thus the accurate light intensity corresponding to the desired measurement target wavelength can be obtained to thereby perform the accurate spectroscopic measurement.

In the spectroscopic measurement device according to the above aspect of the invention, it is preferable that the filter drive section applies the analog voltage, a variation pattern of which with time is a predetermined fixed pattern, to the gap amount changing section, the V-λ data is data representing a relationship between the voltage applied to the gap amount changing section and the wavelength of the light taken out by the first reflecting film and the second reflecting film in a state in which a fluctuation of the inter-reflecting film gap is converged after the voltage is applied to the gap amount changing section, the storage section stores a delay time from when a predetermined voltage is applied to the gap amount changing section until the light with a wavelength corresponding to the voltage of the V-λ data is taken out by the first reflecting film and the second reflecting film when applying the analog voltage of the variation pattern to the gap amount changing section, and the light intensity acquisition section obtains the light intensity detected by the detection section at a timing at which the delay time elapses from a timing at which the voltage monitored by the voltage monitoring section reaches the target voltage corresponding to the measurement target wavelength.

In this aspect of the invention, the relationship between the voltage applied to the gap amount changing section and the wavelength of the light taken out by the first reflecting film and the second reflecting film in the state in which the fluctuation of the inter-reflecting film gap is converged (settled) after the voltage is applied to the gap amount changing section is recorded as the V-λ data.

On the other hand, the variation pattern of the analog voltage to be applied to the gap amount changing section by the filter drive section is set to a certain specific fixed pattern similarly to the aspect of the invention described above. Further, the storage section stores the delay time from when the predetermined voltage is applied until the light (the light with the wavelength corresponding to the voltage based on the V-λ data) with the wavelength corresponding to the voltage is taken out by the first reflecting film and the second reflecting film when applying the voltage to the gap amount changing section based on the variation pattern. It should be noted that the variation pattern of the analog voltage is not limited to a single fixed pattern, but can include a plurality of patterns, and in such a case, it is sufficient to store the delay time corresponding to each of the patterns in the storage section.

In this aspect of the invention having such a configuration, the light intensity acquisition device obtains the target voltage corresponding to the measurement target wavelength from the V-λ data, and then obtains the light intensity detected by the detection section at the timing at which the delay time stored in the storage section elapses from the timing at which the voltage monitored by the voltage monitoring section reaches the target voltage. In this case, since the detection of the light intensity with consideration for the signal delay and the vibration delay based on the physicality of the second substrate can be performed, and the accurate light intensity corresponding to the desired measurement target wavelength can be obtained, it is possible to perform the accurate spectroscopic measurement.

In the spectroscopic measurement device according to the above aspect of the invention, it is preferable that the filter drive section applies a periodic drive voltage adapted to periodically move the second substrate back and forth to the gap amount changing section as the analog voltage.

According to this aspect of the invention, the periodic drive voltage for periodically moving the second substrate back and forth is applied as the analog voltage.

On this occasion, even in the case in which the drive speed of the second substrate is high, it is possible to perform the detection of the light intensity at any timing during the back and forth movement.

For example, in the case of obtaining the light intensity corresponding to a plurality of measurement target wavelengths during the transition from the state in which no deflection of the second substrate exists to the state in which the second substrate is displaced toward the first substrate as much as possible, if the voltage variation per unit time of the analog voltage to be applied to the gap amount changing section is large, the time interval between the measurement points is also shortened, and therefore, the acquisition of the light intensity becomes difficult in some cases.

In contrast, in this aspect of the invention, by applying the periodic drive voltage to the gap amount changing section, the second substrate periodically moves back and forth. Therefore, in the case in which, for example, the gap amount of the inter-reflecting film gap with time periodically varies in a sinusoidal manner, even in the case in which the light intensity corresponding to all of the measurement target voltages fails to be obtained in the first quarter period, the light intensity corresponding to the measurement target voltages can be obtained in the subsequent quarter period or the later drive periods. Thus, it is possible to perform the measurement of the accurate optical spectrum of the measurement target light.

In the spectroscopic measurement device according to the above aspect of the invention, it is preferable that a period of the periodic drive voltage is longer than a natural period inherent in the second substrate.

According to this aspect of the invention, the period of the periodic drive voltage is set to be longer than the natural period inherent in the second substrate. Here, the natural period inherent in the second substrate denotes the period of the vibration generated by the electrostatic attractive force acting on the second substrate and the elastic force (the spring force) of the second substrate when applying a specific step voltage to the second substrate. In the case in which the period of the periodic drive voltage is shorter than such a natural period, the drive of the second substrate becomes unstable in some cases due to the vibration with the natural period when applying the periodic drive voltage to move the second substrate back and forth, and thus the measurement accuracy might be degraded. In contrast, in the case in which the period of the periodic drive voltage is longer than the natural period of the second substrate, the vibration with the natural period of the second substrate is not excited, and thus, the second substrate can stably be driven periodically. In other words, it is possible to improve the measurement accuracy of the light intensity without being affected by the vibration excited with the natural period inherent in the second substrate.

In the spectroscopic measurement device according to the above aspect of the invention, it is preferable that the light intensity acquisition section obtains the light intensity of the light with the measurement target wavelength a plurality of times, and takes an average value of the light intensity taken the plurality of times as a measurement value.

By periodically driving the second substrate as described above, it becomes possible to obtain the light intensity corresponding to the measurement target voltage a plurality of times. In this aspect of the invention, since the average value of the plurality of light intensity values corresponding to the measurement target voltage thus measured as described above, the more accurate measurement value corresponding to the measurement target voltage can be obtained, and thus, the measurement accuracy in the spectroscopic measurement device can be improved.

In the spectroscopic measurement device according to the above aspect of the invention, it is preferable that the filter drive section varies the gap amount of the inter-reflecting film gap from an initial gap amount with no deflection of the second substrate to a predetermined minimum gap amount, and the minimum gap amount is smaller than a lower limit gap amount corresponding to a minimum wavelength in a measurement target wavelength band.

According to this aspect of the invention, in the measurement by the spectroscopic measurement device, the filter drive section varies the inter-reflecting film gap to the minimum gap amount smaller than the lower limit gap corresponding to the minimum wavelength in the measurement target wavelength band. In other words, the filter drive section drives the second substrate with the displacement amount obtained by adding a certain margin to the gap range corresponding to the measurement target wavelength band.

Thus, even in the case in which the displacement amount of the second substrate driven by the filter drive section varies due to, for example, the measurement environment, the measurement target wavelength band can be covered, and the accurate measurement of the optical spectrum can be performed.

A spectroscopic measurement device according to another aspect of the invention includes a first reflecting film and a second reflecting film opposed to each other via an inter-reflecting film gap, a gap amount changing section adapted to change a gap amount of the inter-reflecting film gap, a detection section adapted to detect a light intensity of light taken out by the first reflecting film and the second reflecting film, a filter drive section adapted to apply an analog voltage continuously varying to the gap amount changing section, a voltage monitoring section adapted to monitor the voltage applied to the gap amount changing section, a storage section adapted to store V-λ data corresponding to a relationship between the voltage applied to the gap amount changing section and a wavelength of the light taken out by the first reflecting film and the second reflecting film, and a light intensity acquisition section adapted to obtain the light intensity detected by the detection section at a timing at which the light taken out by the first reflecting film and the second reflecting film has a desired measurement target wavelength based on the voltage monitored by the voltage monitoring section.

In this aspect of the invention, similarly to the aspect of the invention described above, the voltage monitoring section monitors the voltage to be applied to the gap amount changing section, and the light intensity acquisition section obtains the light intensity at the timing at which the light taken out by the first reflecting film and the second reflecting film has the measurement target wavelength. Therefore, it results that the light intensity with consideration for the delay of the displacement of the inter-reflecting film gap is obtained, and thus, the spectroscopic measurement can promptly and accurately be performed.

In the spectroscopic measurement device according to the above aspect of the invention, it is preferable that the filter drive section applies the analog voltage, a variation pattern of which with time is a predetermined fixed pattern, to the gap amount changing section, the V-λ data is data representing a relationship between the voltage applied to the gap amount changing section and the wavelength of the light taken out by the first reflecting film and the second reflecting film at the timing at which the voltage is applied to the gap amount changing section when applying the analog voltage with the variation pattern to the gap amount changing section, and the light intensity acquisition section obtains a target voltage corresponding to the measurement target wavelength based on the V-λ data, and obtains the light intensity detected by the detection section at a timing at which the voltage monitored by the voltage monitoring section reaches the target voltage.

In this aspect of the invention, the light intensity acquisition device obtains the target voltage corresponding to the measurement target wavelength from the V-λ data, and then obtains the light intensity at the timing at which the voltage monitored by the voltage monitoring section reaches the target voltage, and thus the accurate light intensity corresponding to the desired measurement target wavelength can be obtained to thereby perform the accurate spectroscopic measurement.

In the spectroscopic measurement device according to the above aspect of the invention, it is preferable that the filter drive section applies the analog voltage, a variation pattern of which with time is a predetermined fixed pattern, to the gap amount changing section, the V-λ data is data representing a relationship between the voltage applied to the gap amount changing section and the wavelength of the light taken out by the first reflecting film and the second reflecting film in a state in which a fluctuation of the inter-reflecting film gap is converged after the voltage is applied to the gap amount changing section, the storage section stores a delay time from when a predetermined voltage is applied to the gap amount changing section until the light with a wavelength corresponding to the voltage of the V-λ data is taken out by the first reflecting film and the second reflecting film when applying the analog voltage of the variation pattern to the gap amount changing section, and the light intensity acquisition section obtains the light intensity detected by the detection section at a timing at which the delay time elapses from a timing at which the voltage monitored by the voltage monitoring section reaches the target voltage corresponding to the measurement target wavelength.

In this aspect of the invention, the light intensity acquisition device obtains the target voltage corresponding to the measurement target wavelength from the V-λ data, and then obtains the light intensity detected by the detection section at the timing at which the delay time stored in the storage section elapses from the timing at which the voltage monitored by the voltage monitoring section reaches the target voltage. In this case, since the detection of the light intensity with consideration for the signal delay and the vibration delay based on the physicality of the second substrate can be performed, and the accurate light intensity corresponding to the desired measurement target wavelength can be obtained, it is possible to perform the accurate spectroscopic measurement.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

A first embodiment of the invention will hereinafter be explained with reference to the accompanying drawings.

Configuration of Spectroscopic Measurement Device

Figure 1:
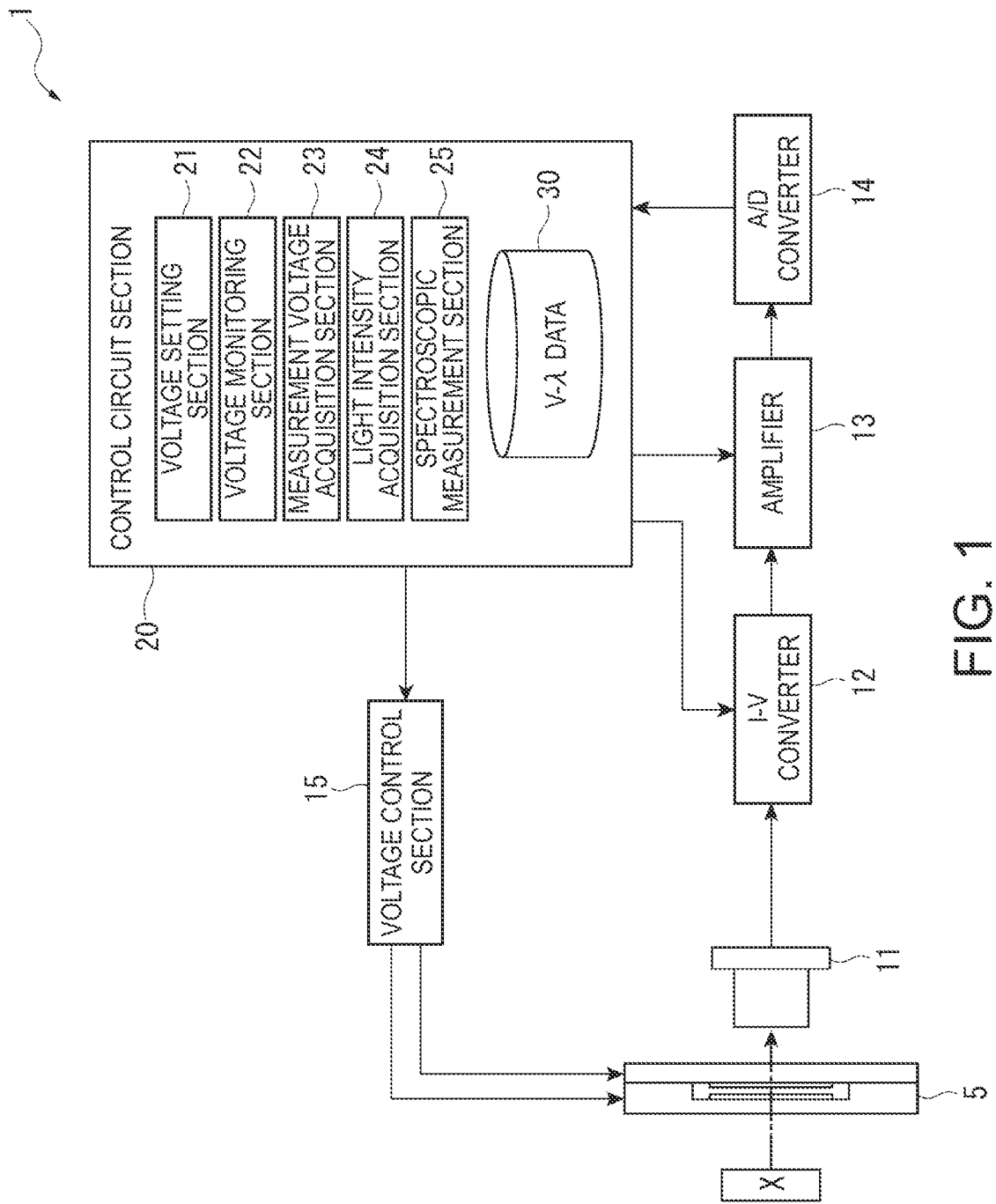
FIG. 1 is a block diagram showing a schematic configuration of a spectroscopic measurement device according to a first embodiment of the invention.

FIG. 1 is a block diagram showing a schematic configuration of a spectroscopic measurement device according to the present embodiment.

The spectroscopic measurement device 1 is a device for analyzing the light intensity of each wavelength in the measurement target light having been reflected by, for example, the measurement object X to thereby measure the optical spectrum of the measurement target light. It should be noted that although in the present embodiment, the example of measuring the measurement target light reflected by the measurement object X is described, in the case of using a light emitting body such as a liquid crystal panel, it is possible to use the light emitted from the light emitting body as the measurement target light.

Further, as shown in FIG. 1, the spectroscopic measurement device 1 is provided with a variable wavelength interference filter 5, a detector 11, an I-V converter 12, an amplifier 13, an A/D converter 14, a voltage control section 15, and a control circuit section 20.

The detector 11 receives the light transmitted through the variable wavelength interference filter 5, and then outputs a detection signal (an electrical current) corresponding to the light intensity (an amount of light) of the light thus received.

The I-V converter 12 converts the detection signal input from the detector 11 into a voltage, and then outputs the voltage to the amplifier 13.

The amplifier 13 amplifies the voltage (the detection voltage), which corresponds to the detection signal, and is input from the I-V converter 12.

The A/D converter 14 converts the detection voltage (an analog signal) input from the amplifier 13 into a digital signal, and then outputs the digital signal to the control circuit section 20.

The voltage control section 15 applies a voltage to an electrostatic actuator 56, described later, of the variable wavelength interference filter 5 based on the control by the control circuit section 20.

Configuration of Variable Wavelength Interference Filter

Figure 2:
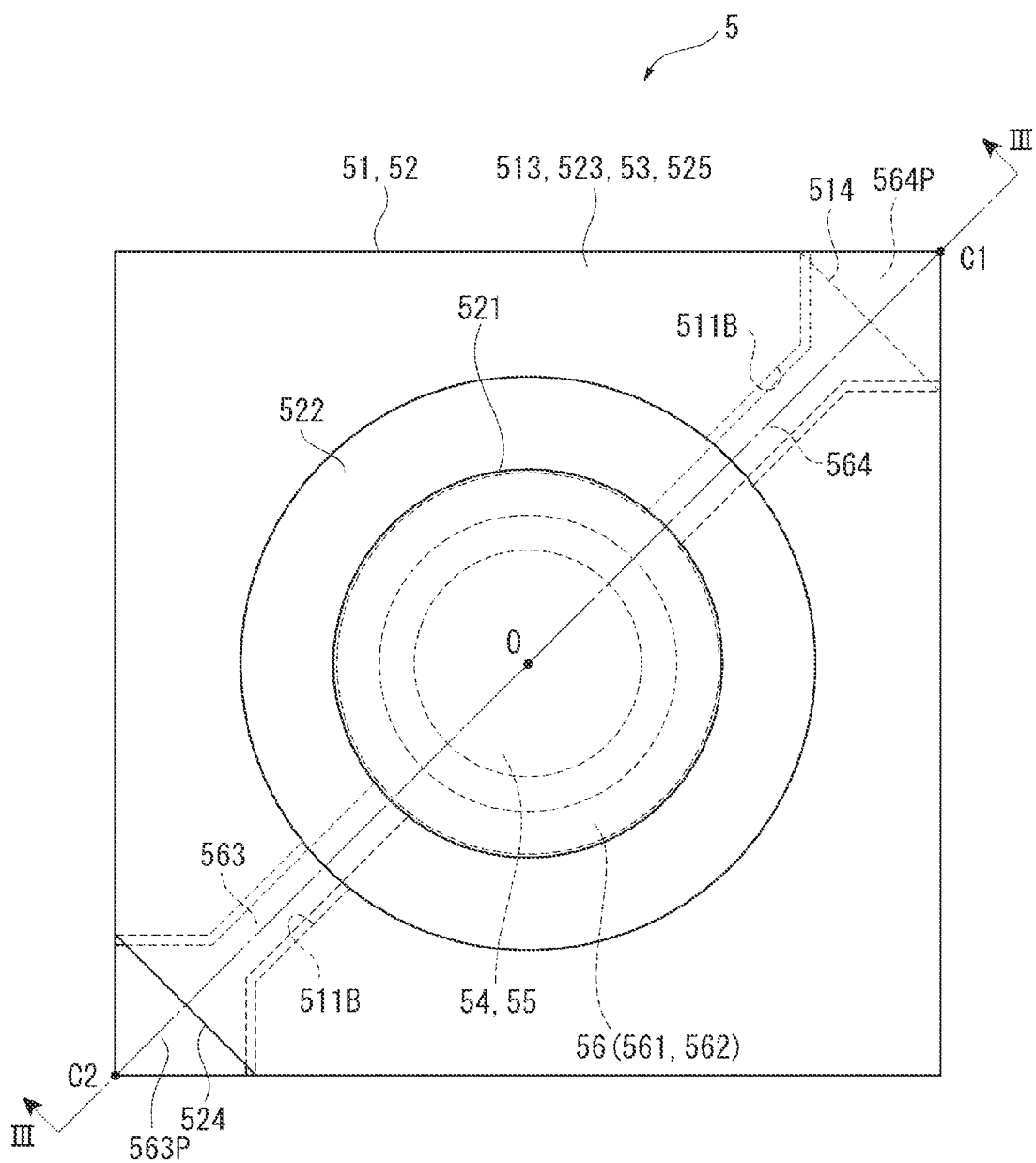
FIG. 2 is a plan view showing a schematic configuration of the variable wavelength interference filter according to the first embodiment.
Figure 3:
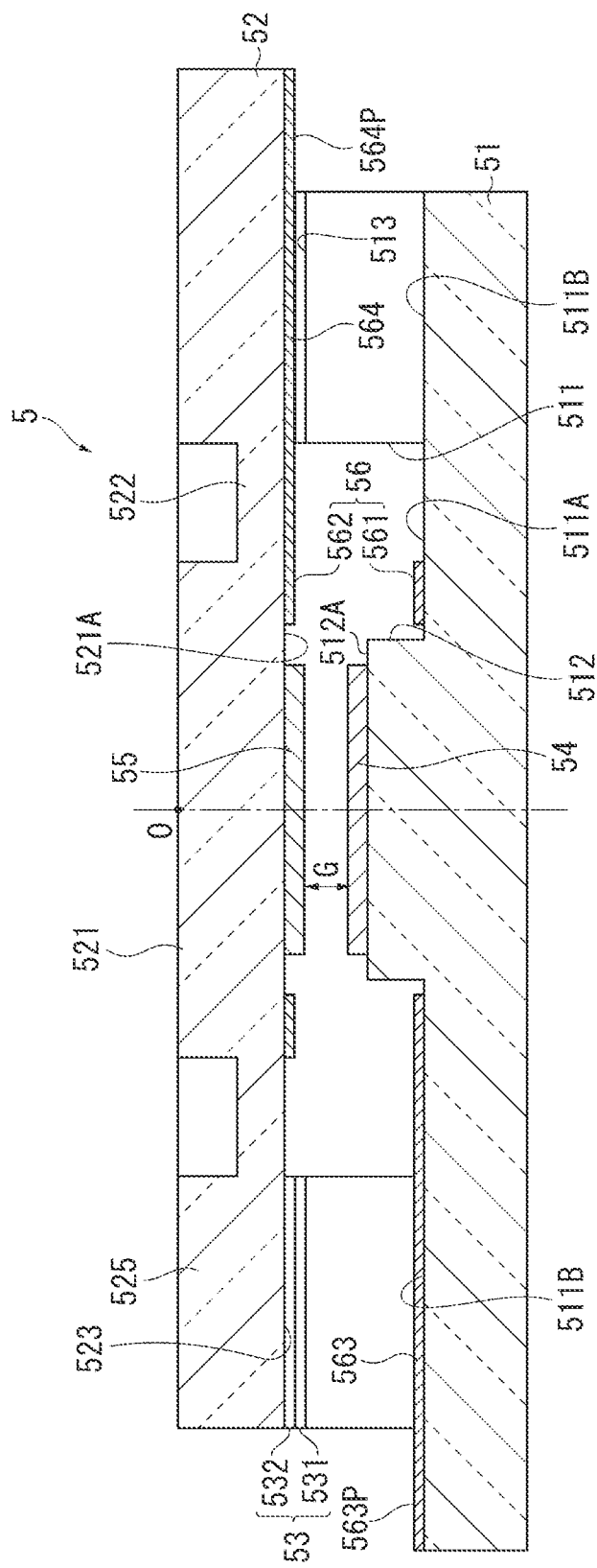
FIG. 3 is a cross-sectional view showing a schematic configuration of the variable wavelength interference filter according to the first embodiment.

Here, the variable wavelength interference filter 5 to be incorporated in the spectroscopic measurement device 1 will hereinafter be explained. FIG. 2 is a plan view showing a schematic configuration of the variable wavelength interference filter. FIG. 3 is a cross-sectional view obtained by cutting the variable wavelength interference filter shown in FIG. 2 along the III-III line.

As shown in FIG. 2, the variable wavelength interference filter 5 is an optical member having, for example, a rectangular plate shape. As shown in FIG. 3, the variable wavelength interference filter 5 is provided with a stationary substrate 51 and a movable substrate 52. The stationary substrate 51 and the movable substrate 52 are each made of a variety of types of glass such as soda glass, crystalline glass, quartz glass, lead glass, potassium glass, borosilicate glass, or alkali-free glass, or a quartz crystal, for example. Further, the stationary substrate 51 and the movable substrate 52 are configured integrally by bonding a first bonding section 513 of the stationary substrate 51 and a second bonding section 523 of the movable substrate 52 to each other with bonding films 53 (a first bonding film 531 and a second bonding film 532) each formed of, for example, a plasma polymerization film consisting primary of, for example, siloxane.

The stationary substrate 51 is provided with a stationary reflecting film 54 constituting a first reflecting film according to the invention, and the movable substrate 52 is provided with a movable reflecting film 55 constituting a second reflecting film according to the invention. The stationary reflecting film 54 and the movable reflecting film 55 are disposed so as to be opposed to each other via an inter-reflecting film gap G (the gap according to the invention). Further, the variable wavelength interference filter 5 is provided with the electrostatic actuator 56 used for regulating (varying) the gap amount of the inter-reflecting film gap G. The electrostatic actuator 56 corresponds to a gap amount changing section according to the invention. The electrostatic actuator 56 is constituted by a stationary electrode 561 provided to the stationary substrate 51 and a movable electrode 562 provided to the movable substrate 52. The stationary electrode 561 and the movable electrode 562 are opposed to each other via an inter-electrode gap. Here, there can be adopted a configuration of disposing these electrodes 561, 562 directly on the surfaces of the stationary substrate 51 and the movable substrate 52, respectively, or a configuration of disposing the electrodes 561, 562 via other film members. Here, the gap amount of the inter-electrode gap is larger than the gap amount of the inter-reflecting film gap G.

Further, in a filter plan view shown in FIG. 2 in which the variable wavelength interference filter 5 is viewed from the thickness direction of the stationary substrate 51 (the movable substrate 52), the planar center point O of the stationary substrate 51 and the movable substrate 52 coincides with the center point of the stationary reflecting film 54 and the movable reflecting film 55, and further coincides with the center point of a movable section 521 described later.

It should be noted that in the explanation below, the plan view from the thickness direction of the stationary substrate 51 or the movable substrate 52, namely the plan view of the variable wavelength interference filter 5 viewed from the stacking direction of the stationary substrate 51, the bonding films 53, and the movable substrate 52, is referred to as the filter plan view.

Configuration of Stationary Substrate

The stationary substrate 51 is provided with an electrode arrangement groove 511 and a reflecting film installation section 512 formed by etching. The stationary substrate 51 is formed to have a thickness dimension larger than that of the movable substrate 52, and no deflection of the stationary substrate 51 occurs due to the electrostatic attractive force when applying a voltage between the stationary electrode 561 and the movable electrode 562, or the internal stress of the stationary electrode 561.

Further, a vertex C1 of the stationary substrate 51 is provided with a cutout section 514, and a movable electrode pad 564P described later is exposed on the stationary substrate 51 side of the variable wavelength interference filter 5.

The electrode arrangement groove 511 is formed to have a ring-like shape cantered on the planar center point O of the stationary substrate 51 in the filter plan view. The reflecting film installation section 512 is formed so as to protrude toward the movable substrate 52 from the central portion of the electrode arrangement groove 511 in the plan view described above. The bottom surface of the electrode arrangement groove 511 forms an electrode installation surface 511A on which the stationary electrode 561 is disposed. Further, the projection tip surface of the reflecting film installation section 512 forms a reflecting film installation surface 512A.

Further, the stationary substrate 51 is provided with electrode extraction grooves 511B respectively extending from the electrode arrangement groove 511 toward the vertexes C1, C2 of the outer peripheral edge of the stationary substrate 51.

The electrode installation surface 511A of the electrode arrangement groove 511 is provided with the stationary electrode 561. More specifically, the stationary electrode 561 is disposed in an area of the electrode installation surface 511A, the area being opposed to the movable electrode 562 of the movable section 521 described later. Further, it is also possible to adopt the configuration in which an insulating film for providing an insulation property between the stationary electrode 561 and the movable electrode 562 is stacked on the stationary electrode 561.

Further, the stationary substrate 51 is provided with a stationary extraction electrode 563 extending from the outer peripheral edge of the stationary electrode 561 toward the vertex C2. The extending tip portion (a part located at the vertex C2 of the stationary substrate 51) of the stationary extraction electrode 563 forms a stationary electrode pad 563P to be connected to the voltage control section 15.

It should be noted that although in the present embodiment, there is shown a configuration of providing the single stationary electrode 561 to the electrode installation surface 511A, it is also possible to adopt, for example, a configuration (a dual electrode configuration) having two concentric electrodes centered on the planar center point O.

As described above, the reflecting film installation section 512 is formed to have a roughly columnar shape coaxial with the electrode arrangement groove 511 and having a diameter smaller than that of the electrode arrangement groove 511, and is provided with the reflecting film installation surface 512A opposed to the movable substrate 52 of the reflecting film installation section 512.

As shown in FIG. 3, the stationary reflecting film 54 is installed in the reflecting film installation section 512. As the stationary reflecting film 54, a metal film made of, for example, Ag, or an alloy film made of, for example, an Ag alloy can be used. Further, it is also possible to use a dielectric multilayer film with a high refractive index layer made of, for example, $TiO_2$, and a low refractive index layer made of, for example, $SiO_2$. Further, it is also possible to use a reflecting film obtained by stacking a metal film (or an alloy film) on a dielectric multilayer film, a reflecting film obtained by stacking a dielectric multilayer film on a metal film (or an alloy film), a reflecting film obtained by laminating a single refractive layer (made of, e.g., $TiO_2$ or $SiO_2$) and a metal film (or an alloy film) with each other, and so on.

Further, it is also possible to form an antireflection film on a plane of incidence of light (the surface not provided with the stationary reflecting film 54) of the stationary substrate 51 at a position corresponding to the stationary reflecting film 54. The antireflection film can be formed by alternately stacking low refractive index films and high refractive index films, and decreases the reflectance of the visible light on the surface of the stationary substrate 51, while increasing the transmittance thereof.

Further, the surface of the stationary substrate 51, which is opposed to the movable substrate 52, and on which the electrode arrangement groove 511, the reflecting film installation section 512, and the electrode extraction grooves 511B are not formed by etching, constitutes a first bonding section 513. The first bonding section 513 is provided with the first bonding film 531, and by bonding the first bonding film 531 to the second bonding film 532 provided to the movable substrate 52, the stationary substrate 51 and the movable substrate 52 are bonded to each other as described above.

Configuration of Movable Substrate

The movable substrate 52 is provided with the movable section 521 having a circular shape centered on the planar center point O, a holding section 522 coaxial with the movable section 521 and for holding the movable section 521, and a substrate peripheral section 525 disposed on the outer side of the holding section 522 in the filter plan view shown in FIG. 2.

Further, as shown in FIG. 2, in the movable substrate 52, there is formed a cutout section 524 so as to correspond to the vertex C2, and when viewing the variable wavelength interference filter 5 from the movable substrate 52 side, the stationary electrode pad 563P is exposed.

The movable section 521 is formed to have a thickness dimension larger than that of the holding section 522, and is formed in the present embodiment, for example, to have the same thickness dimension as that of the movable substrate 52. The movable section 521 is formed to have a diameter larger than at least the diameter of the outer peripheral edge of the reflecting film installation surface 512A in the filter plan view. Further, the movable section 521 is provided with the movable electrode 562 and the movable reflecting film 55.

It should be noted that it is also possible to form an antireflection film on the opposite surface of the movable section 521 to the stationary substrate 51 similarly to the case of the stationary substrate 51. Such an antireflection film can be formed by alternately stacking low refractive index films and high refractive index films, and is capable of decreasing the reflectance of the visible light on the surface of the movable substrate 52, and increasing the transmittance thereof.

The movable electrode 562 is opposed to the stationary electrode 561 via the inter-electrode gap, and is formed to have a ring-like shape, which is the same shape as that of the stationary electrode 561. Further, the movable substrate 52 is provided with a movable extraction electrode 564 extending from the outer peripheral edge of the movable electrode 562 toward the vertex C1 of the movable substrate 52. The extending tip portion (a part located at the vertex C1 of the movable substrate 52) of the movable extraction electrode 564 forms a movable electrode pad 564P to be connected to the voltage control section 15.

The movable reflecting film 55 is disposed at the central portion of a movable surface 521A of the movable section 521 so as to be opposed to the stationary reflecting film 54 via the inter-reflecting film gap G. As the movable reflecting film 55, a reflecting film having the same configuration as that of the stationary reflecting film 54 described above is used.

It should be noted that although the example in which the inter-electrode gap is larger than the inter-reflecting film gap G is described in the present embodiment as described above, the invention is not limited to this example. It is also possible to adopt the configuration in which the inter-reflecting film gap G is larger than the inter-electrode gap depending on the wavelength band of the measurement target light in, for example, the case of using an infrared beam or a far infrared beam as the measurement target light.

The holding section 522 is a diaphragm surrounding the periphery of the movable section 521, and is formed to have a thickness dimension smaller than that of the movable section 521. Such a holding section 522 is easier to be deflected than the movable section 521, and it becomes possible to displace the movable section 521 toward the stationary substrate 51 with a weak electrostatic attractive force. On this occasion, since the movable section 521 has a larger thickness dimension and higher rigidity than those of the holding section 522, the shape variation of the movable section 521 does not occur even in the case in which the holding section 522 is pulled toward the stationary substrate 51 due to the electrostatic attractive force. Therefore, deflection of the movable reflecting film 55 provided to the movable section 521 does not occur, and it becomes possible to always keep the stationary reflecting film 54 and the movable reflecting film 55 in a parallel state.

It should be noted that although in the present embodiment the holding section 522 having a diaphragm shape is shown as an example, the shape is not limited thereto, but a configuration of, for example, providing beam-like holding sections arranged at regular angular intervals centered on the planar center point O can also be adopted.

As described above, the substrate peripheral section 525 is disposed outside the holding section 522 in the filter plan view. The surface of the substrate peripheral section 525 opposed to the stationary substrate 51 is provided with the second bonding section 523 opposed to the first bonding section 513. Further, the second bonding section 523 is provided with the second bonding film 532, and as described above, by bonding the second bonding film 532 to the first bonding film 531, the stationary substrate 51 and the movable substrate 52 are bonded to each other.

In the variable wavelength interference filter 5 described hereinabove, the stationary electrode pad 563P and the movable electrode pad 564P are connected respectively to the voltage control section 15. Therefore, by the voltage control section 15 applying a voltage between the stationary electrode 561 and the movable electrode 562, the movable section 521 is displaced toward the stationary substrate 51 due to the electrostatic attractive force. Thus, it becomes possible to vary the gap amount of the inter-reflecting film gap G to a predetermined amount.

Configuration of Control Circuit Section

Going back to FIG. 1, the control circuit section 20 of the spectroscopic measurement device 1 will be explained.

The control circuit section 20 is configured by combining, for example, a CPU and a memory, and controls the overall operation of the spectroscopic measurement device 1. As shown in FIG. 1, the control circuit section is provided with a voltage setting section 21, a voltage monitoring section 22, a measurement voltage acquisition section 23, a light intensity acquisition section 24, and a spectroscopic measurement section 25.

Further, the control circuit section 20 is provided with a storage section 30, and the storage section 30 stores V-λ data.

The V-λ data is the data showing a relationship of the wavelength of the light taken out by the variable wavelength interference filter 5 with respect to the voltage applied to the electrostatic actuator 56 of the variable wavelength interference filter 5.

Figure 4A:
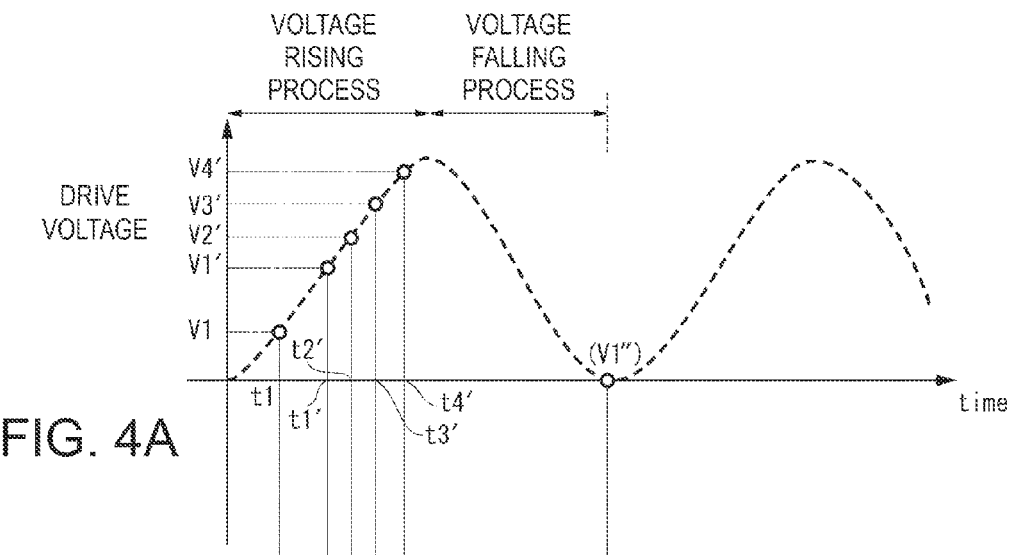
FIGS. 4A and 4B are diagrams for explaining the detection timing of the light intensity of the light with the measurement target wavelength in the first embodiment.
Figure 4B:
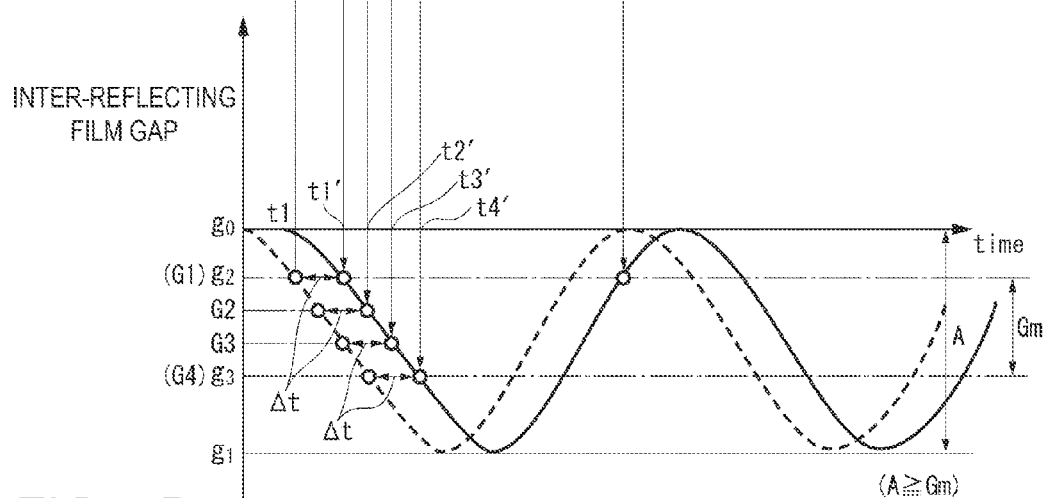

FIGS. 4A and 4B are diagrams for explaining the detection timing of the light intensity of the light with the measurement target wavelength in the first embodiment. Specifically, FIG. 4A is a diagram showing a voltage variation pattern (a voltage waveform) of the analog voltage to be applied to the electrostatic actuator 56 of the variable wavelength interference filter 5 with respect to time, and FIG. 4B is a diagram showing a relationship between the time and the gap amount of the inter-reflecting film gap G. Further, in FIG. 4B, the dotted line represents the relationship between the time and the inter-reflecting film gap assuming that the signal delay and the delay due to the vibration of the movable section 521 do not occur, and the solid line represents the relationship between the time and the inter-reflecting film gap in the case in which the signal delay or the delay due to the vibration of the movable section 521 occurs. It should be noted that the gap amounts Gn (G1, G2, G3, and G4) are the gap amounts of the inter-reflecting film gap G corresponding to the wavelengths λn (λ1, λ2, λ3, and λ4), respectively.

In the present embodiment, the drive voltage applied to the electrostatic actuator 56 by the voltage control section 15 and the voltage setting section 21 becomes a periodic drive voltage (an analog voltage) varying continuously. Further, although described later in detail, in the present embodiment, the variation pattern (the drive voltage waveform) of the periodic drive voltage with respect to the time becomes a predetermined fixed variation pattern shown in FIG. 4A, and it results that the electrostatic actuator 56 is driven with the periodic drive voltage of the variation pattern.

Here, in the case of applying the periodic drive voltage to the electrostatic actuator 56 to thereby displace the movable section 521, a slight signal delay in the control circuit section 20 and the voltage control section 15, the drive time delay until the movable section 521 is displaced to a predetermined position, and so on are caused. Therefore, as shown in, for example, FIGS. 4A and 4B, at the timing t1 at which a predetermined voltage V1 is applied to the electrostatic actuator 56, it is unachievable to obtain the wavelength (the measurement target wavelength) of the light, which is to be taken out in the state in which the vibration of the movable section 521 is settled while continuously applying the voltage V1 to the electrostatic actuator 56. The measurement target wavelength can actually be obtained at the timing t1', which is delayed by predetermined delay time Δt from when the voltage V1 has been applied to the electrostatic actuator 56. Here, in the present embodiment, as shown in FIG. 4A, since the analog voltage varying continuously is applied, the timing t1' corresponds to the timing at which the voltage varies by ΔV from V1 to reach a voltage V1' (or V1'').

Therefore, as the V-λ data in the present embodiment, the voltage values Vn' (V1', V2', V3', . . . , or V1'', V2'', V3'', . . . ) at the respective timings at which the predetermined wavelengths λn (λ1, λ2, λ3, . . . ) are transmitted through the variable wavelength interference filter 5 when applying the periodic drive voltage with a preset variation pattern to the electrostatic actuator 56, and the wavelengths λn corresponding respectively to the voltage values Vn' (or Vn'') are stored so as to be associated with each other. It should be noted that it is also possible to store the gap amounts Gn of the inter-reflecting film gap G instead of the wavelengths λn. Specifically, the V-λ data of the present embodiment becomes the data taking the signal delay in the control circuit section 20 and the voltage control section 15, the vibration delay of the movable section 521 (the holding section 522) due to the spring force of the movable substrate 52, and so on into consideration.

Such V-λ data as described above is generated based on the actual measurement values by applying the analog voltage with the variation pattern described above to the electrostatic actuator 56, and then detecting the wavelength of the light received by the detection section at the timing at which the predetermined voltage is applied in, for example, the manufacturing process of the variable wavelength interference filter 5.

The voltage setting section 21 constitutes a filter driving section according to the invention together with the voltage control section 15. In the spectroscopic measurement process performed by the spectroscopic measurement device 1, the voltage setting section 21 controls the voltage control section 15 to apply the periodic drive voltage (a voltage in the alternating-current waveform), which is an analog voltage varying continuously, to the electrostatic actuator 56.

Here, the voltage setting section 21 applies the periodic drive voltage having a period longer than the natural period in the natural vibration of the movable section 521 in the movable substrate 52 as the periodic drive voltage. The natural period of the movable section 521 is roughly 100 μs although varying due to the elastic force (the spring force) provided to the holding section 522 and the measurement environment (e.g., the air pressure). Therefore, it is possible for the voltage setting section 21 to set the periodic drive voltage having the period of, for example, about 2 ms.

The voltage waveform of the periodic drive voltage to be applied to the electrostatic actuator 56 is fixed to a predetermined variation pattern as shown in FIG. 4A. In the case of applying the voltage with such a variation pattern to the electrostatic actuator 56, the movable section 521 is driven back and force toward the stationary substrate 51 in a cyclic manner. Thus, as shown in FIG. 4B, the gap amount of the inter-reflecting film gap G continuously varies between the initial gap amount $g_0$ and the minimum gap amount $g_1$ (in a driving amplitude A).

Here, assuming that the range of the gap amount of the inter-reflecting film gap G necessary to take out the light in the measurement target wavelength band is the gap range (a measurement target gap range Gm) from the upper limit gap amount $g_2$ to the lower limit gap amount $g_3$, the variation pattern of the voltage is set so as to fulfill (driving amplitude A)≥(measurement target gap range Gm). Specifically, the variation pattern of the periodic drive voltage is set so that the upper limit gap amount $g_2$ is equal to or smaller than the initial gap amount $g_0$, and the lower limit gap amount $g_3$ is equal to or larger than the minimum gap amount $g_1$.

By setting such a periodic drive voltage, it results that the upper limit margin between the initial gap amount $g_0$ and the upper limit gap amount $g_2$, and the lower limit margin between the lower limit gap amount $g_3$ and the minimum gap amount $g_1$ are provided. By providing the lower limit margin, it becomes possible to surely take out the light corresponding to the measurement target band. For example, in the case of adopting the configuration in which the lower limit gap amount g3 and the minimum gap amount g1 of the measurement target wavelength band coincide with each other (no lower limit margin is provided), it might become unachievable to take out the light with the minimum wavelength in the measurement target wavelength band in the case in which the variation amount of the movable section 521 is reduced due to the measurement environment and so on. In contrast, in the present embodiment, since the lower limit margin is provided, it becomes possible to surely take out the light with the minimum wavelength. Further, by providing the upper limit margin, the influence of the measurement environment variation can be reduced.

It should be noted that although in the present embodiment, the example of providing the upper limit margin and the lower limit margin is described, it is also possible that the periodic drive voltage is set so as not to provide either one or both of these margins.

The voltage monitoring section 22 always monitors the voltage applied from the voltage control section 15 to the electrostatic actuator 56 during the period in which, for example, the spectroscopic measurement process by the spectroscopic measurement device 1 is performed.

The measurement voltage acquisition section 23 sets the measurement target voltage based on the V-λ data stored in the storage section 30. In other words, the measurement voltage acquisition section 23 sets the measurement target wavelengths with predetermined wavelength intervals (a measurement pitch) in the measurement target wavelength band, and then reads the measurement target voltages corresponding respectively to these measurement target wavelengths from the V-λ data. It should be noted that the measurement target wavelength band and the measurement pitch can be those arbitrarily changed by, for example, setting input by the measurer. On this occasion, the measurement voltage acquisition section 23 sets the measurement target wavelength band in accordance with the setting input, and then sets the measurement target wavelengths at the measurement pitch in the measurement target wavelength band.

Here, the voltage corresponding to a predetermined measurement target wavelength is different between a voltage rising process in which the periodic drive voltage rises from the minimum voltage Vmin (e.g., 0V) to the maximum voltage Vmax and a voltage falling process in which the periodic drive voltage falls from the maximum voltage Vmax to the minimum voltage Vmin. For example, as shown in FIGS. 4A and 4B, in the case in which the light intensity of the light (wavelength λ1) transmitted when the inter-reflecting film gap G is equal to the gap amount G1 is detected in the voltage rising process, the measurement voltage acquisition section 23 obtains the voltage V1' in the voltage rising process as the measurement voltage. Further, in the case in which the light intensity of the same light (wavelength λ1) is detected in the voltage falling process, the measurement voltage acquisition section 23 obtains the voltage V1" in the voltage falling process as the measurement voltage.

It should be noted that although the example in which the voltage V1" appears in the voltage falling process is described in FIGS. 4A and 4B, in the case of, for example, the margin is small, or the delay time is long, there may occur the case in which the voltage V1" fails to be included in the voltage falling process. In this case, it becomes possible to determine the voltage corresponding to the measurement target wavelength based on the number of times of detection of the voltages V1' and V1". For example, in the example described above, in the case in which the number of times of detection of the voltage V1' is an odd number, the voltage V1' is taken as the measurement voltage, and in the case in which the number of times of detection of the voltage V1' is an even number, the voltage V1' is not taken as the measurement voltage. On the other hand, in the case in which the number of times of detection of the voltage V1" is an even number, the voltage V1" is taken as the measurement voltage, and in the case in which the number of times of detection of the voltage V1" is an odd number, the voltage V1" is not taken as the measurement voltage. Even in this case, the voltage applied at the timing at which the measurement target wavelength is detected can be set as the measurement voltage in a similar manner.

The light intensity acquisition section 24 detects the detection signal output from the detection section 11 at the timings (t1', t2', t3', and t4') at which the measurement target voltages obtained by the measurement voltage acquisition section 23 are applied to the electrostatic actuator 56, to thereby obtain the light intensity of the light with the measurement target wavelength.

It should be noted that although in the example shown in FIGS. 4A and 4B, the light intensity acquisition section 24 obtains all of the light intensity values corresponding to the measurement target voltage values in the period (the voltage rising process) in which the movable section 521 is driven as much as a quarter cycle from the initial state, the invention is not limited to this example.

In the case in which, for example, the periodic drive speed of the movable section 521 is high, there is a case in which it is difficult to obtain the light intensity values corresponding to a plurality of measurement target voltages in the period in which the movable section 521 is driven as much as a quarter cycle from the initial state. In such a case, as shown in, for example, FIGS. 5A and 5B, it is also possible to measure the light intensity values corresponding to some (two in FIGS. 5A and 5B) measurement target voltages out of all of the measurement target voltages at the timings (t1', t3') during the period in which the driving is performed from the initial state to a quarter cycle, and measure the light intensity values corresponding to the remaining measurement target voltages during (t2", t4") the period from the quarter cycle to the half cycle. Even in such a case, as described above, since the measurement voltage acquisition section 23 obtains the measurement voltage values (V2", V4") corresponding to the measurement target wavelengths in the voltage falling process, the light intensity values corresponding to the desired measurement target wavelengths can accurately be obtained. Further, it is also possible to further perform the measurement in the period on and after the half cycle in accordance with the number of the measurement target voltage values set. The same applies also to this case, since the measurement voltage values corresponding to the voltage rising process and the voltage falling process are set, the light intensity of the light with the desired measurement target wavelength can be obtained.

The spectroscopic measurement section 25 measures the optical spectrum of the measurement target light based on the light intensity corresponding to each of the measurement target wavelengths obtained by the light intensity acquisition section 24. Further, the spectroscopic measurement section 25 can generate the spectrum curve based on the optical spectrum thus measured. Further, the spectroscopic measurement section 25 outputs the measurement result and the spectrum curve to an output device such as a display or printing equipment.

Spectroscopic Measurement Method Using Spectroscopic Measurement Device

Then, a spectroscopic measurement method using the spectroscopic measurement device 1 described above will be explained with reference to the drawings.

Figure 6:
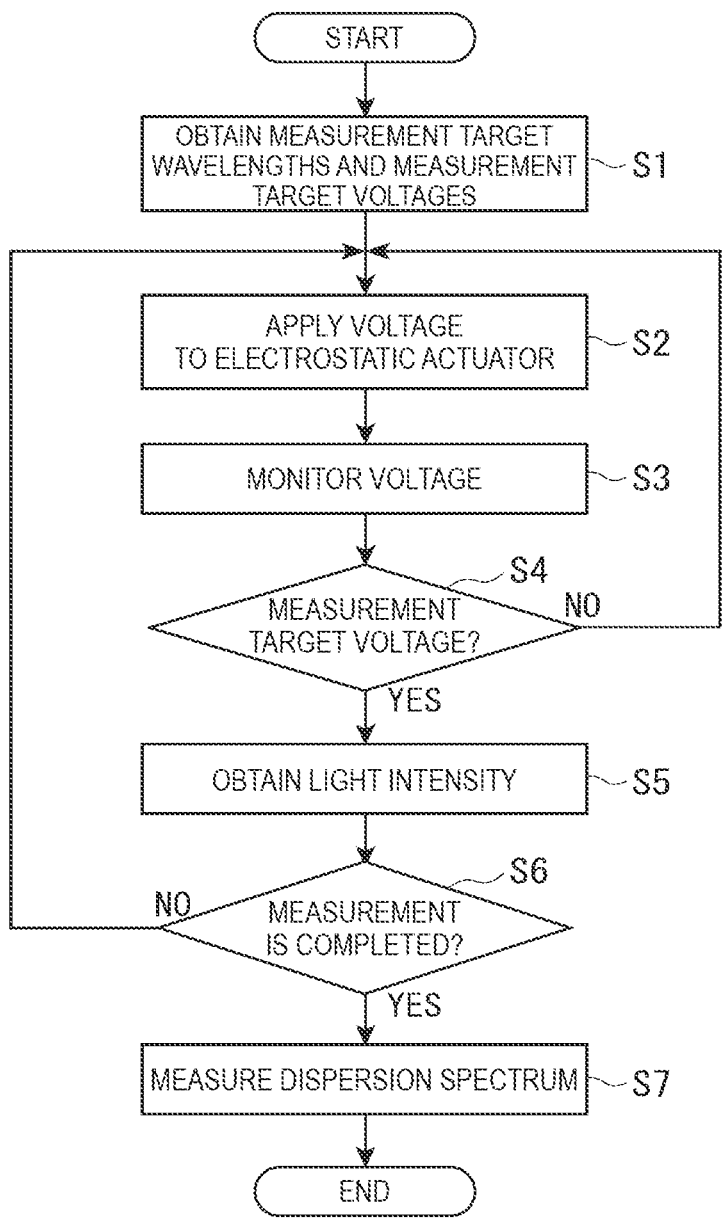
FIG. 6 is a flowchart showing a spectroscopic measurement method according to the first embodiment.

FIG. 6 is a flowchart of the spectroscopic measurement method according to the present embodiment.

As shown in FIG. 6, in the spectroscopic measurement method according to the present embodiment, when the measurement is started, the measurement voltage acquisition section 23 first obtains (step S1) the measurement target wavelengths and the measurement target voltages corresponding to the measurement target wavelengths. Specifically, in the case in which, for example, no setting input by the measurer exists, the measurement target voltages (Vn' or Vn") corresponding to the measurement target wavelengths (fin) having the measurement pitch set in advance are obtained from the V-λ data stored in the storage section 30. Further, in the case in which, for example, the measurement target wavelength band and the measurement pitch are designated based on the setting input by the measurer, the measurement target wavelengths having the measurement pitch designated are calculated in the measurement wavelength band designated, and the measurement target voltages corresponding to the measurement target wavelengths are obtained based on the V-λ data.

Figure 5A:
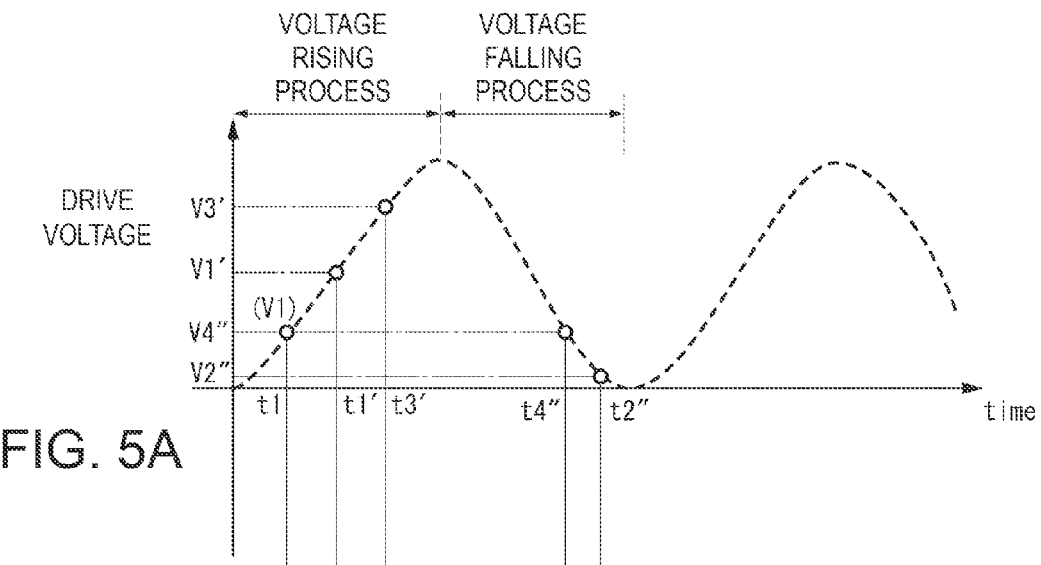
FIGS. 5A and 5B are diagrams for explaining the detection timing of the light intensity of the light with the measurement target wavelength in the first embodiment.
Figure 5B:
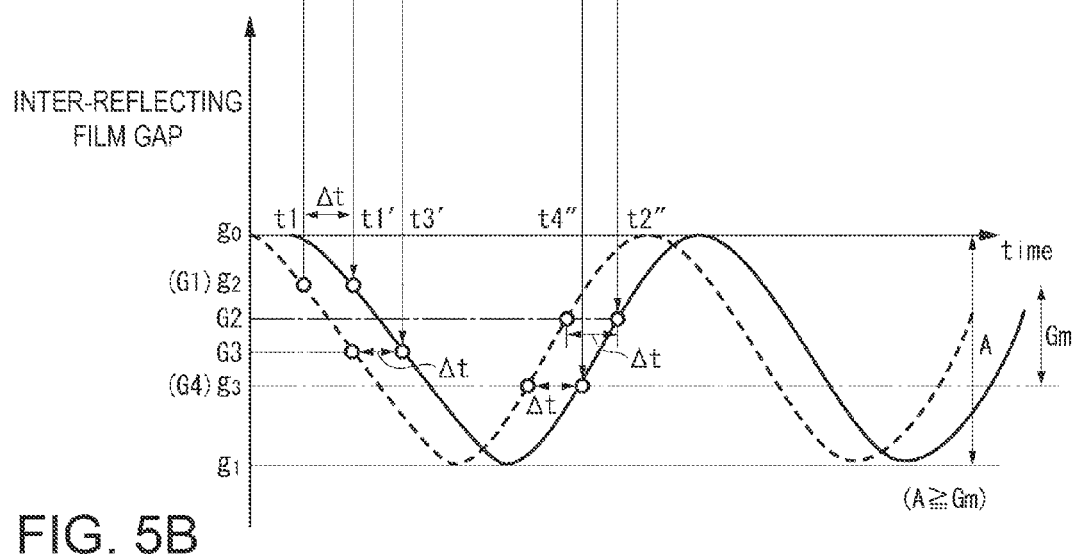

In the case of, for example, detecting the light intensity values of four measurement target wavelengths in the voltage rising process as shown in FIGS. 4A and 4B, the voltages V1', V2', V3', and V4' in the voltage rising process are obtained as the measurement target voltages. Further, in the case of detecting the light intensity of the lights having the wavelengths λ1, λ3 corresponding to the gap amounts G1, G3, respectively, in the voltage rising process, and detecting the light intensity of the lights having the wavelengths λ2, λ4 corresponding to the gap amounts G2, G4, respectively, in the voltage falling process as shown in FIGS. 5A and 5B, the voltages V1', V3' in the voltage rising process and the voltage V2", V4" in the voltage falling process are obtained as the measurement target voltages.

Thereafter, the voltage setting section 21 and the voltage control section 15 apply (step S2) the periodic drive voltage having the variation pattern (the voltage waveform) set in advance to the electrostatic actuator 56 of the variable wavelength interference filter 5. In this step S2, the voltage setting section 21 sets the periodic drive voltage (an alternating voltage) varying continuously and having a period longer than the natural period of the movable section 521, and then makes the voltage control section 15 apply the periodic drive voltage to the electrostatic actuator 56. Thus, the movable section 521 periodically moves back and forth with respect to the stationary substrate 51, and the gap amount of the inter-reflecting film gap G periodically varies as indicated by the solid line shown in FIGS. 4B and 5B.

Further, the voltage monitoring section 22 starts (step S3) a voltage monitoring process for monitoring the voltage applied to the electrostatic actuator 56 simultaneously with the process of the step S2. On this occasion, the voltage monitoring section 22 also monitors whether the tendency of the variation of the voltage applied is the voltage rising process or the voltage falling process at the same time.

Further, the light intensity acquisition section determines (step S4) whether or not the voltage monitored by the voltage monitoring section 22 in the step S3 reaches the measurement target voltage set in the step S1.

In this step S4, if the voltage monitored by the voltage monitoring section 22 is not the measurement target voltage (if the determination is "NO"), the process returns to the steps S2 and S3, and the application of the periodic drive voltage to the electrostatic actuator 56 and the voltage monitoring by the voltage monitoring section 22 are continued.

In contrast, if it is determined in the step S4 that the voltage monitored by the voltage monitoring section 22 has reached the measurement target voltage (if the determination is "YES"), the light intensity acquisition section 24 obtains (measures) (step S5) the light intensity of the measurement target wavelength based on the detection signal input from the detection section 11.

Further, the light intensity acquisition section stores the light intensity thus obtained and the measurement target voltages (or the measurement target gap amounts or the measurement target wavelengths corresponding respectively to the measurement target voltages) to the storage section 30 so as to be associated with each other.

Subsequently, the control circuit section 20 determines (step S6) whether or not the measurement process has been completed. In the present embodiment, the light intensity measurement is performed once for each of the measurement target wavelengths. Therefore, in the step S6, whether or not the acquisition of the light intensity by the light intensity acquisition section 24 has been completed with respect to all of the measurement target voltages obtained in the step S1 to thereby determine whether or not the measurement process has been completed. Further, in this step S6, if the determination is "NO," namely if it is determined that the measurement process has not been completed, the process returns to the steps S2 and S3, and the application of the periodic drive voltage to the electrostatic actuator 56 and the voltage monitoring by the voltage monitoring section 22 are continued.

In contrast, if the determination in the step S6 is "YES," namely, if it is determined that the measurement process has been completed, the voltage setting section 21 and the voltage control section 15 stop applying the voltage to the electrostatic actuator 56. Then, the spectroscopic measurement section 25 measures (step S7) the optical spectrum of the measurement target light based on the light intensity corresponding to each of the measurement target voltages (each of the measurement target wavelengths) obtained in the step S5 and stored in the storage section 30.

Functions and Advantages of Embodiment

In the spectroscopic measurement device 1 according to the present embodiment, the voltage setting section 21 sets the periodic drive voltage as an analog voltage varying continuously as the voltage to be applied to the electrostatic actuator 56, and then makes the voltage control section 15 apply the periodic drive voltage to the electrostatic actuator 56. Thus, the movable section 521 of the variable wavelength interference filter 5 changes continuously with respect to the stationary substrate 51, and the gap amount of the inter-reflecting film gap G varies continuously in the measurement target gap range corresponding to the measurement target wavelength band. Further, the light intensity acquisition section 24 obtains the light intensity detected by the detection section 11 at the timing at which the light with the measurement target wavelength is transmitted from the variable wavelength interference filter 5 based on the voltage applied to the electrostatic actuator 56 monitored by the voltage monitoring section 22.

In the spectroscopic measurement device 1 having such a configuration, the light intensity corresponding to the measurement target wavelength can promptly be obtained by the light intensity acquisition section 24 without requiring to wait the settling of the vibration of the movable section 521. Therefore, the measurement of the optical spectrum of the measurement target light in the spectroscopic measurement device 1 can also be performed in a prompt manner.

In the present embodiment, the periodic drive voltage applied to the electrostatic actuator 56 by the voltage setting section 21 and the voltage control section 15 has a predetermined fixed variation pattern. Further, the V-λ data stored in the storage section 30 becomes the data representing the relationship of the wavelength λn (or the gap amount Gn of the inter-reflecting film gap G) of the light detected by the detection section 11 at the timing at which the voltage Vn' (or Vn") is applied when applying the periodic drive voltage with the drive waveform to the electrostatic actuator 56.

Therefore, by reading out the measurement target voltages Vn' (or Vn") corresponding respectively to the measurement target wavelengths λn from the V-λ data, the light intensity acquisition section 24 can easily obtain the measurement target wavelengths λn by obtaining the light intensity thus detected by the detection section 11 at the timing at which the voltage monitored by the voltage monitoring section 22 reaches the measurement target voltages Vn' (or Vn") without requiring to, for example, calculate the delay time and so on.

Further, the voltage setting section 21 controls the voltage control section 15 to apply the periodic drive voltage varying periodically to the electrostatic actuator 56. Thus, the movable section 521 periodically moves back and forth toward the stationary substrate 51. In other words, it results that the inter-reflecting film gap varies within the measurement target gap range at a frequency of once in a quarter period. Therefore, even in the case in which, for example, it is difficult to obtain the light intensity corresponding to the measurement target voltage within a quarter period, it is possible to obtain the light intensity corresponding to the measurement target voltage, which has failed to be obtained, in the subsequent quarter period. Thus, it is possible to obtain the light intensity corresponding to each of the measurement target voltages set previously, and thus the spectroscopic measurement section can perform the accurate measurement of the optical spectrum.

In the present embodiment, the drive period of the periodic drive voltage set by the voltage setting section 21 is set to a value longer than the natural period inherent in the movable section 521.

Therefore, when applying the periodic drive voltage to the electrostatic actuator 56, the back-and-forth drive of the movable section 521 is not affected by the vibration excitation based on the natural period of the movable section 521. Further, the vibration component (e.g., the vibration based on the natural period) other than the vibration of the movable section 521 based on the periodic drive voltage becomes easy to be removed by, for example, a low-pass filter as a noise component. Therefore, it is possible to perform the more accurate measurement of the light intensity with respect to the predetermined measurement target voltages, and thus the measurement accuracy of the optical spectrum can be improved.

In the present embodiment, the voltage setting section 21 sets the periodic drive voltage so that the lower limit margin and the upper limit margin are set on the lower and upper side of the measurement target gap range of the inter-reflecting film gap G corresponding to the measurement target wavelength band of the measurement target light. Thus, the problem that it becomes unachievable to obtain the light intensity corresponding to the measurement wavelength band due to the variation of the measurement environment and so on can be avoided, and thus the accurate measurement of the optical spectrum can be executed.

Second Embodiment

Then, a second embodiment of the invention will be explained with reference to the accompanying drawings.

In the spectroscopic measurement device according to the first embodiment described above, the data representing the relationship between the voltages Vn' (or Vn") and the wavelengths Xn of the lights detected by the detection section 11 at the timings of applying the respective voltages Vn' (or Vn") when applying the periodic drive voltage with the predetermined variation pattern to the electrostatic actuator 56 is used as the V-λ data. In other words, the example in which the V-λ data with consideration for the delay is stored in the storage section 30 is described. In contrast, the present embodiment is different from the first embodiment in the point that the data (the V-λ data with no consideration for the delay of the inter-reflecting film gap) representing the relationship between the voltages Vn and the wavelengths λ of the light detected by the detection section 11 in the state in which the vibration of the movable section 521 is converged (settled) after the corresponding voltages Vn are applied is used as the V-λ data.

It should be noted that the components constituting the spectroscopic measurement device according to the present embodiment are the same as those of the first embodiment described above, and therefore, the explanation here will be omitted.

In the present embodiment, similarly to the first embodiment described above, the voltage setting section 21 and the voltage control section 15 apply the periodic drive voltage with the variation pattern set previously to the electrostatic actuator 56.

Further, the storage section 30 according to the present embodiment stores the data with no consideration for the delay as the V-λ data as described above. Further, the storage section 30 stores the delay time Δt after applying the predetermined voltages Vn until the lights with the wavelengths λn corresponding respectively to the voltages Vn represented by the V-λ data are detected by the detection section 11. The delay time Δt is measured in advance in the manufacturing process or the inspection process, and is then stored in the storage section 30.

Figure 7:
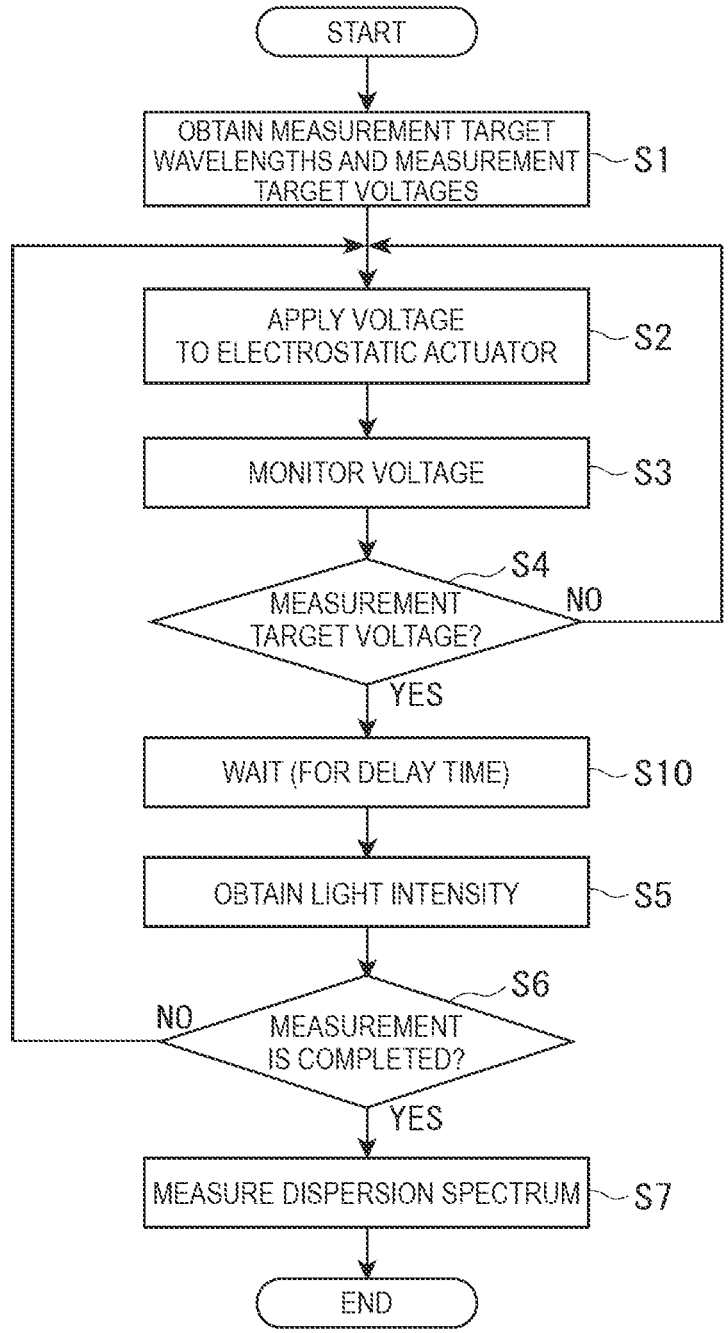
FIG. 7 is a flowchart showing a spectroscopic measurement method according to a second embodiment of the invention.

FIG. 7 is a flowchart of the spectroscopic measurement method according to the present embodiment.

Figure 8A:
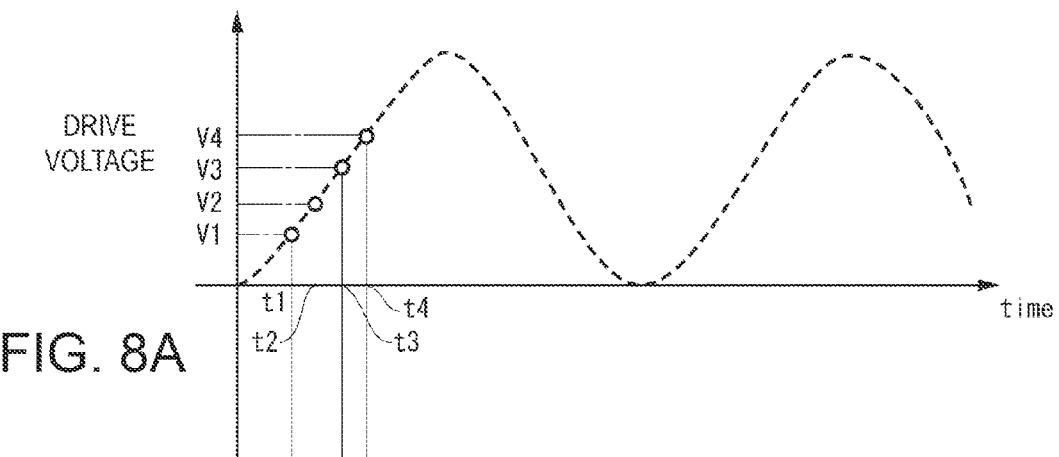
FIGS. 8A and 8B are diagrams for explaining the detection timing of the light intensity of the light with the measurement target wavelength in the second embodiment.
Figure 8B:
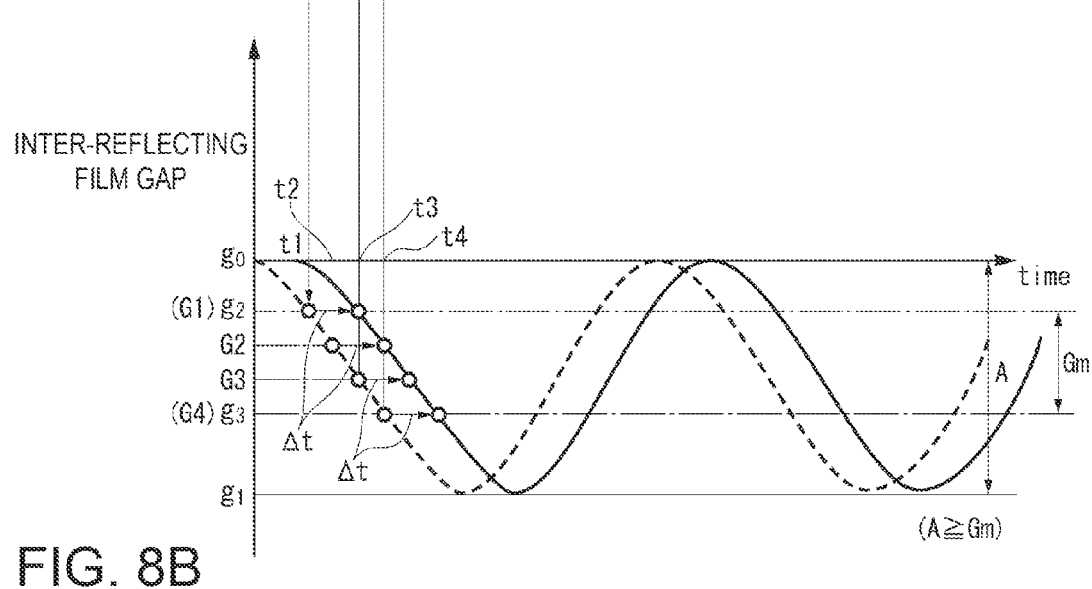

FIGS. 8A and 8B are diagrams for explaining the detection timing of the light intensity of the light with the measurement target wavelength in the second embodiment, and specifically, FIG. 8A is a diagram showing the variation pattern (the voltage waveform) of the analog voltage to be applied to the electrostatic actuator 56, and FIG. 8B is a diagram showing the relationship between the time and the gap amount of the inter-reflecting film gap G.

In the spectroscopic measurement device according to the present embodiment described above, as shown in FIG. 7, the spectroscopic measurement is performed using substantially the same method as in the first embodiment.

Specifically, in the step S1, the measurement voltage acquisition section 23 first obtains the measurement target wavelengths λn and the measurement target voltages Vn based on the V-λ data. It should be noted that in FIGS. 8A and 8B, the gap amounts Gn (G1, G2, G3, and G4) are the gap amounts of the inter-reflecting film gap G corresponding to the measurement target wavelengths λn (λ1, λ2, λ3, and λ4), respectively.

Subsequently, the process of the steps S2, S3 is performed, and the voltage setting section 21 and the voltage control section 15 apply the periodic drive voltage with the variation pattern set in advance to the electrostatic actuator 56, and then the voltage monitoring section 22 monitors the voltage applied to the electrostatic actuator 56.

Then, the process in the step S4 is performed, and the light intensity acquisition section 24 determines whether or not the voltage applied to the electrostatic actuator 56 reaches the measurement target voltages Vn (V1, V2, V3, and V4 in FIG. 8A) set in the step S1.

Then, in the second embodiment, if the determination is "YES" in the step S4, the light intensity acquisition section 24 waits (step S10) for the elapsed time Δt after the timings to (t1, t2, t3, and t4 in FIGS. 8A and 8B) at which the voltage applied to the electrostatic actuator 56 reaches the measurement target voltages Vn based on the time measured by a timing section.

Then, the light intensity acquisition section 24 performs the process of the step S5 after the step S10. In other words, the light intensity acquisition section 24 obtains the light intensity detected by the detection section 11 at the timings when the elapsed time Δt has elapsed after the timings at which the voltage applied to the electrostatic actuator 56 reaches the measurement target voltages Vn.

Subsequently, the process of the steps S6, S7 is performed.

Functions and Advantages of Second Embodiment

In the present embodiment, the data with no consideration for the delay, namely the data representing the relationship between the voltages Vn and the wavelengths λ of the light detected by the detection section 11 in the state in which the vibration of the movable section 521 is converged (settled) after the corresponding voltages Vn are applied, is used as the V-λ data. Further, the delay time Δt after the voltages Vn are applied until the corresponding measurement target wavelengths λn are detected is stored in advance in the storage section 30. In such a configuration, as described above, the light intensity acquisition section 24 can accurately obtain the light intensity with respect to the desired measurement target wavelengths λn similarly to the embodiment described above by obtaining the light intensity detected by the detection section 11 at the timings at which the delay time Δt has elapsed after the timings at which the applied voltage to the electrostatic actuator 56 reaches the measurement target voltages Vn.

Further, although it is necessary to wait for the delay time Δt after the voltage to be monitored by the voltage monitoring section 22 reaches the voltages Vn, since the delay time Δt is sufficiently shorter than the time until the vibration of the movable section 521 is converged, the time necessary for obtaining the light intensity of the light with the measurement target wavelength is also short, and therefore, the prompt spectroscopic measurement by the spectroscopic measurement device 1 can be performed.

Further, although in the first embodiment described above, the measurement target voltages to be obtained with respect to the measurement target wavelengths λn are different between the voltage rising process and the voltage falling process (Vn' and Vn"), in the present embodiment, it is possible to obtain the measurement target voltages Vn regardless of the voltage rising process and the voltage falling process. Therefore, the voltage monitoring section 22 is not required to monitor whether the voltage is in the rising process or in the falling process, and thus simplification of the process can be achieved.

Third Embodiment

Then, a third embodiment of the invention will hereinafter be described.

In the spectroscopic measurement device according to any one of the first and second embodiments described above, there is shown the example in which the light intensity acquisition section 24 obtains the light intensity once for each of the measurement target voltages thus set. In contrast, the spectroscopic measurement device according to the third embodiment is different from the first embodiment in the point that the light intensity is obtained a plurality of times for each of the measurement target voltages.

It should be noted that the components constituting the spectroscopic measurement device according to the third embodiment are the same as those of the first embodiment described above, and therefore, the explanation here will be omitted.

Figure 9A:
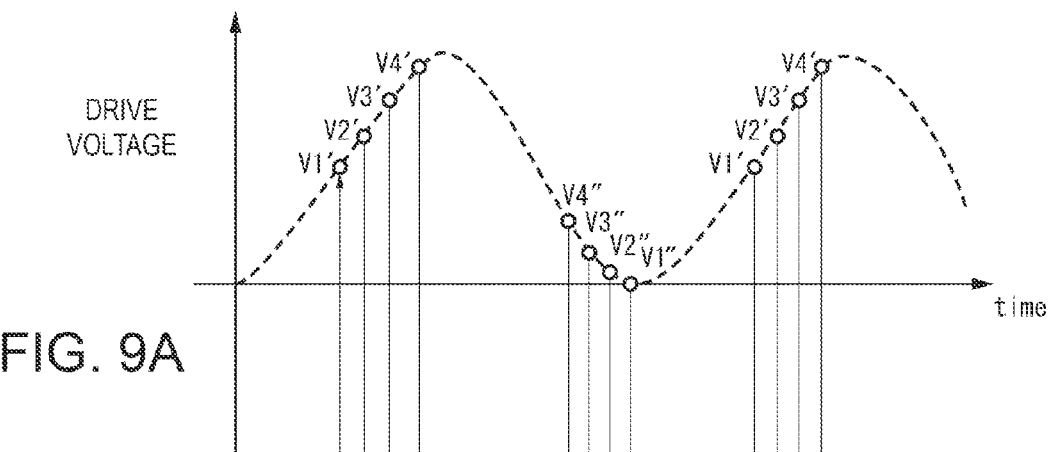
FIGS. 9A and 9B are diagrams for explaining the detection timing of the light intensity of the light with the measurement target wavelength in a third embodiment of the invention.
Figure 9B:
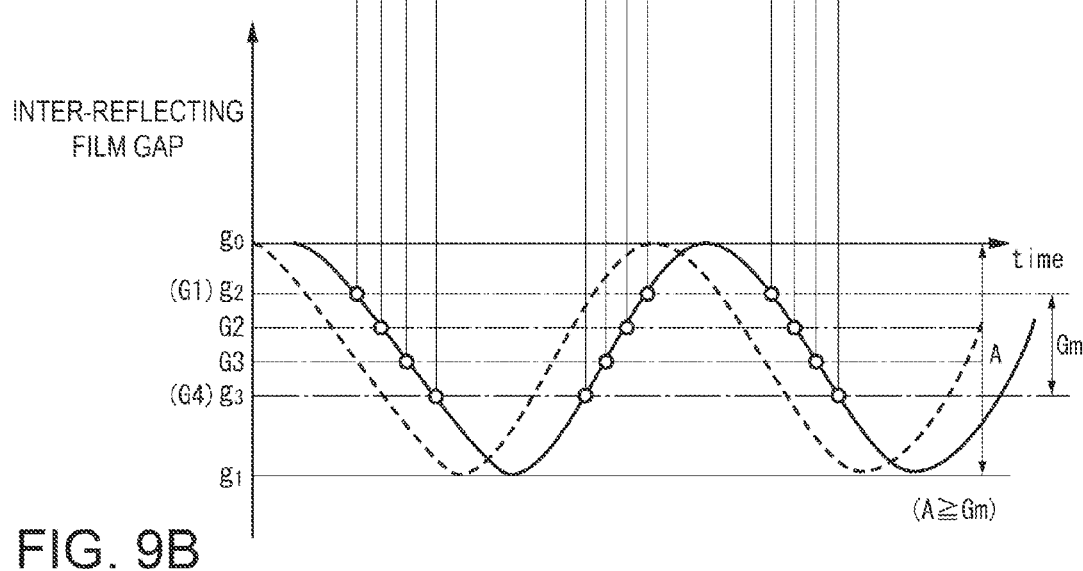

FIGS. 9A and 9B are diagrams for explaining the detection timing of the light intensity of the light with the measurement target wavelength in the third embodiment.

As shown in FIGS. 9A and 9B, the light intensity acquisition section 24 according to the present embodiment performs the acquisition of the light intensity at least two times for each of the measurement target voltages obtained by the measurement voltage acquisition section 23.

Further, the light intensity acquisition section 24 calculates the average value from a plurality of light intensity values obtained for each of the measurement target voltages, and takes the average value as the measurement value corresponding to the measurement target voltage.

In the present embodiment, since the measurement value of the light intensity of the light with the measurement target wavelength is obtained based on the average value of the light intensity values obtained a plurality of times, the measurement result with higher accuracy can be obtained.

Further, in the present embodiment, an example of obtaining the light intensity corresponding to the predetermined measurement target wavelength a plurality of times based on the V-λ data with consideration for the delay will be described below. However, the present embodiment can also be applied to the case of obtaining the light intensity corresponding to the measurement target wavelength based on the V-λ data with no consideration for the delay and the delay time Δt having been measured in advance as in the second embodiment.

Modified Examples

It should be noted that the invention is not limited to the embodiments described above, but includes modifications, improvements, and so on within a range where the advantages of the invention can be achieved.

For example, in each of the embodiments described above, it is also possible to adopt the configuration in which the variable wavelength interference filter 5 is provided with a gap detection device for detecting the gap amount of the inter-reflecting film gap G. As such a gap detection device, for example, the configuration of disposing gap detecting electrodes at portions of the stationary substrate 51 and the movable substrate 52 opposed to each other, and detecting the gap amount based on the capacitance of these gap detecting electrodes can be cited.

In such a configuration, by detecting the variation of the inter-reflecting film gap G in the case of applying the drive voltage with the predetermined variation pattern to the electrostatic actuator 56 using the gap detection device, the gap amount of the inter-reflecting film gap G at the timing at which the predetermined voltage is applied to the electrostatic actuator 56 can be detected. In other words, the center wavelength of the light detected by the detection section 11 with respect to the measurement target voltage can be detected, and thus the spectroscopic measurement with higher accuracy can be performed.

Further, there is a case in which the characteristics of the variable wavelength interference filter 5 are varied due to, for example, the variation of the use environment. For example, in the first and the third embodiment, even in the case in which it is set in shipping that the light with the measurement target wavelength λ1 is transmitted in accordance with the measurement target voltage V1', there is a case in which the characteristics of the variable wavelength interference filter 5 vary to the state of transmitting the light with the measurement target wavelength λ1' in accordance with the measurement target voltage V1'.

In contrast, as described above, in the configuration in which the gap detection device is provided, it is possible to measure the gap amount of the inter-reflecting film gap G when applying the measurement target voltage V1', and the V-λ data can appropriately be corrected based on the gap amount of the inter-reflecting film gap G thus measured. For example, in the example described above, the measurement target wavelength corresponding to the measurement target voltage V1' is corrected from λ1 to λ1' in the V-λ data.

The same applies to the second embodiment, and even in the case in which Δt1 is set as the delay time in shipping, there is a case in which the delay time is changed to Δt1' due to the environment variation and so on.

On this occasion, the control circuit section monitors the gap amount of the inter-reflecting film gap G detected by the gap detection device, and then obtains the time (the delay time Δt1') from the timing at which the measurement target voltage V1 is applied until the gap amount of the inter-reflecting film gap detected by the gap detection device reaches the gap amount corresponding to the measurement target wavelength λ1. Then, in the case in which the delay time Δt1' thus obtained is different from the default delay time Δt1 stored in the storage section 30, the control circuit section stores the delay time Δt1' newly obtained to the storage section 30.

By performing such a calibration process as described above, the degradation of the accuracy of the spectroscopic process by the spectroscopic measurement device 1 can be suppressed, and thus, the improvement of the product life of the spectroscopic measurement device 1 can be achieved.

Although in each of the embodiments described above, the electrostatic actuator 56 is described as an example of the gap amount changing section for varying the gap amount of the inter-reflecting film gap G, the invention is not limited to this example.

It is also possible to adopt a configuration of, for example, using a dielectric actuator disposing a first dielectric coil instead of the stationary electrode 561, and disposing a second dielectric coil or a permanent magnet instead of the movable electrode 562.

Further, it is also possible to adopt a configuration of using a piezoelectric actuator instead of the electrostatic actuator 56. In this case, for example, a lower electrode layer, a piezoelectric film, and an upper electrode layer are disposed on the holding section 522 in a stacked manner, and the voltage applied between the lower electrode layer and the upper electrode layer is varied as an input value, and thus the piezoelectric film is expanded or contracted to thereby make it possible to deflect the holding section 522.

Although the voltage setting section 21 controls the voltage control section 15 to apply the periodic drive voltage to the electrostatic actuator 56, it is also possible to apply, for example, an analog voltage continuously increasing from the initial state to a predetermined maximum voltage, namely a drive voltage having the voltage rising process in FIGS. 4A, 4B, 5A, and 5B as the variation pattern.

Although the voltage setting section 21 sets the periodic drive voltage having the period longer than the natural period of the movable section 521, the invention is not limited to this configuration, but it is also possible to set the periodic drive voltage with a period equal to or shorter than the natural period of the movable section 521.

Further, although there is described the example in which the voltage setting section 21 and the voltage control section 15 apply the periodic drive voltage with a single variation pattern (the drive waveform) set in advance to the electrostatic actuator 56, the invention is not limited to this configuration, but a configuration in which a plurality of patterns of the periodic drive voltage to be applied to the electrostatic actuator 56 is set in advance can also be adopted. In this case, in the first embodiment, for example, it is possible that the V-λ data is individually set to each of the variation patterns, and the V-λ data used in the light intensity detection is switched in accordance with the variation pattern of the periodic drive voltage applied to the electrostatic actuator 56. Further, in the second embodiment, it is also possible to measure the delay time Δt for each of the variation patterns in advance, and then switch the delay time Δt in accordance with the variation pattern of the periodic drive voltage to be applied to the electrostatic actuator 56 when performing the spectroscopic measurement.

Besides the above, specific structures to be adopted when putting the invention into practice can arbitrarily be replaced with other structures and so on within the range in which the advantages of the invention can be achieved.

The entire disclosure of Japanese Patent application No. 2012-150346, filed Jul. 4, 2012 is expressly incorporated by reference herein

What is claimed is:

1. A spectroscopic measurement device comprising:
   a first substrate;
   a second substrate opposed to the first substrate;
   a first reflecting film provided to the first substrate;
   a second reflecting film provided to the second substrate, and opposed to the first reflecting film across a predetermined gap;
   a gap amount changing section adapted to change the gap amount of the gap by deflecting the second substrate by applying a continuously varying analog voltage;
   a detection section adapted to detect a light intensity of light interfered between the first reflecting film and the second reflecting film;
   a filter drive section adapted to apply the continuously varying analog voltage to the gap amount changing section;
   a voltage monitoring section adapted to monitor the continuously varying analog voltage applied to the gap amount changing section;
   a storage section adapted to store V-λ data corresponding to a relationship between the continuously varying analog voltage applied to the gap amount changing section and a wavelength of the light taken out by the first reflecting film and the second reflecting film; and
   a light intensity acquisition section adapted to obtain the light intensity detected by the detection section at a timing at which the light taken out by the first reflecting film and the second reflecting film has a measurement target wavelength based on the continuously varying analog voltage monitored by the voltage monitoring section.

2. The spectroscopic measurement device according to claim 1, wherein
   the filter drive section applies the continuously varying analog voltage, a variation pattern of which with time is a predetermined fixed pattern, to the gap amount changing section,
   the V-λ data is data representing a relationship between the continuously varying analog voltage applied to the gap amount changing section and the wavelength of the light taken out by the first reflecting film and the second reflecting film at the timing at which the continuously varying analog voltage is applied to the gap amount changing section when applying the continuously varying analog voltage with the variation pattern to the gap amount changing section, and
   the light intensity acquisition section obtains a target voltage corresponding to the measurement target wavelength based on the V-λ data, and obtains the light intensity detected by the detection section at a timing at which the continuously varying analog voltage monitored by the voltage monitoring section reaches the target voltage.

3. The spectroscopic measurement device according to claim 1, wherein
   the filter drive section applies the continuously varying analog voltage, a variation pattern of which with time is a predetermined fixed pattern, to the gap amount changing section,
   the V-λ data is data representing a relationship between the continuously varying analog voltage applied to the gap amount changing section and the wavelength of the light taken out by the first reflecting film and the second reflecting film in a state in which a fluctuation of the gap is converged after the continuously varying analog voltage is applied to the gap amount changing section,
   the storage section stores a delay time from when a predetermined voltage is applied to the gap amount changing section until the light with a wavelength corresponding to a voltage of the V-λ data is taken out by the first reflecting film and the second reflecting film when applying the continuously varying analog voltage of the variation pattern to the gap amount changing section, and
   the light intensity acquisition section obtains the light intensity detected by the detection section at a timing at which the delay time elapses from a timing at which the continuously varying voltage monitored by the voltage monitoring section reaches a target voltage corresponding to the measurement target wavelength.

4. The spectroscopic measurement device according to claim 1, wherein
the filter drive section applies a periodic drive voltage adapted to periodically move the second substrate back and forth to the gap amount changing section as the continuously varying analog voltage.

5. The spectroscopic measurement device according to claim 4, wherein
a period of the periodic drive voltage is longer than a natural period inherent in the second substrate.

6. The spectroscopic measurement device according to claim 4, wherein
the light intensity acquisition section obtains the light intensity of the light with the measurement target wavelength a plurality of times, and takes an average value of the light intensity taken the plurality of times as a measurement value.

7. The spectroscopic measurement device according to claim 1, wherein
the filter drive section varies the gap amount from an initial gap amount with no deflection of the second substrate to a predetermined minimum gap amount, and
the minimum gap amount is smaller than a lower limit gap amount corresponding to a minimum wavelength in a measurement target wavelength band.

8. A spectroscopic measurement device comprising:
a first reflecting film and a second reflecting film opposed to each other across a gap;
a gap amount changing section adapted to change a gap amount of the gap;
a detection section adapted to detect a light intensity of light interfered between the first reflecting film and the second reflecting film;
a filter drive section adapted to apply a continuously varying analog voltage to the gap amount changing section;
a voltage monitoring section adapted to monitor the continuously varying analog voltage applied to the gap amount changing section;
a storage section adapted to store V-λ data corresponding to a relationship between the continuously varying analog voltage applied to the gap amount changing section and a wavelength of the light taken out by the first reflecting film and the second reflecting film; and
a light intensity acquisition section adapted to obtain the light intensity detected by the detection section at a timing at which the light taken out by the first reflecting film and the second reflecting film has a measurement target wavelength based on the continuously varying analog voltage monitored by the voltage monitoring section.

9. The spectroscopic measurement device according to claim 8, wherein
the filter drive section applies the continuously varying analog voltage, a variation pattern of which with time is a predetermined fixed pattern, to the gap amount changing section,
the V-λ data is data representing a relationship between the continuously varying analog voltage applied to the gap amount changing section and the wavelength of the light taken out by the first reflecting film and the second reflecting film at the timing at which the continuously varying analog voltage is applied to the gap amount changing section when applying the continuously varying analog voltage with the variation pattern to the gap amount changing section, and
the light intensity acquisition section obtains a target voltage corresponding to the measurement target wavelength based on the V-λ data, and obtains the light intensity detected by the detection section at a timing at which the continuously varying analog voltage monitored by the voltage monitoring section reaches the target voltage.

10. The spectroscopic measurement device according to claim 8, wherein
the filter drive section applies the continuously varying analog voltage, a variation pattern of which with time is a predetermined fixed pattern, to the gap amount changing section,
the V-λ data is data representing a relationship between the continuously varying analog voltage applied to the gap amount changing section and the wavelength of the light taken out by the first reflecting film and the second reflecting film in a state in which a fluctuation of the gap is converged after the continuously varying analog voltage is applied to the gap amount changing section,
the storage section stores a delay time from when a predetermined voltage is applied to the gap amount changing section until the light with a wavelength corresponding to a voltage of the V-λ data is taken out by the first reflecting film and the second reflecting film when applying the continuously varying analog voltage of the variation pattern to the gap amount changing section, and
the light intensity acquisition section obtains the light intensity detected by the detection section at a timing at which the delay time elapses from a timing at which the continuously varying analog voltage monitored by the voltage monitoring section reaches a target voltage corresponding to the measurement target wavelength.

11. A spectroscopic measurement method comprising:
changing a gap amount of a gap between a first reflecting film and a second reflecting film by applying a continuously varying analog voltage to a gap amount changing section;
detecting a light intensity of light interfered between the first reflecting film and the second reflecting film;
monitoring the applied continuously varying analog voltage to obtain a monitored voltage;
determining a timing at which the light interfered between the first reflecting film and the second reflecting film has a measurement target wavelength based on the monitored voltage; and
obtaining the detected light intensity at the timing.

* * * * *